(12) United States Patent
Vandermeijden et al.

(10) Patent No.: US 9,582,093 B2
(45) Date of Patent: Feb. 28, 2017

(54) PASSIVE PEN WITH GROUND MASS STATE SWITCH

(71) Applicant: Synaptics Incorporated, San Jose, CA (US)

(72) Inventors: Tom Vandermeijden, Los Gatos, CA (US); Christopher Weber, San Jose, CA (US); Doug Krumpelman, San Jose, CA (US); Jeffrey Small, Rochester, NY (US)

(73) Assignee: Synaptics Incorporated, San Jose, CA (US)

( * ) Notice: Subject to any disclaimer, the term of this patent is extended or adjusted under 35 U.S.C. 154(b) by 113 days.

(21) Appl. No.: 14/582,013

(22) Filed: Dec. 23, 2014

(65) Prior Publication Data

US 2015/0331506 A1    Nov. 19, 2015

Related U.S. Application Data

(60) Provisional application No. 62/040,969, filed on Aug. 22, 2014, provisional application No. 61/992,800, filed on May 13, 2014.

(51) Int. Cl.
*G06F 3/033* (2013.01)
*G06F 3/041* (2006.01)
*G06F 3/0354* (2013.01)

(52) U.S. Cl.
CPC .......... *G06F 3/041* (2013.01); *G06F 3/03545* (2013.01)

(58) Field of Classification Search
CPC . G06F 3/03545; G06F 3/04883; G06F 3/0317
USPC ............... 345/173–180; 178/18.01–18.04
See application file for complete search history.

(56) References Cited

U.S. PATENT DOCUMENTS

| | | | | |
|---|---|---|---|---|
| 4,490,607 A | * | 12/1984 | Pease | G06F 3/03542 250/227.13 |
| 7,875,814 B2 | * | 1/2011 | Chen | G06F 3/046 178/18.01 |
| 8,125,469 B2 | | 2/2012 | Badaye et al. | |
| 8,384,697 B2 | | 2/2013 | Sung | |
| 8,508,510 B2 | | 8/2013 | Kim | |
| 8,773,404 B2 | | 7/2014 | Wei et al. | |
| 9,195,351 B1 | * | 11/2015 | Rosenberg | G06F 1/1626 |
| 2009/0167728 A1 | * | 7/2009 | Geaghan | G06F 3/03542 345/179 |
| 2010/0060608 A1 | | 3/2010 | Yousefpor | |
| 2011/0062971 A1 | | 3/2011 | Badaye | |
| 2011/0304577 A1 | | 12/2011 | Brown et al. | |
| 2012/0043142 A1 | | 2/2012 | Grivna | |
| 2012/0086664 A1 | | 4/2012 | Leto | |
| 2012/0327040 A1 | | 12/2012 | Simon et al. | |

(Continued)

FOREIGN PATENT DOCUMENTS

WO    2014061913 A1    4/2014

OTHER PUBLICATIONS

USPTO Office Action dated Jun. 17, 2016, issued in related U.S. Appl. No. 14/581,997 (7 pages).

*Primary Examiner* — Kimnhung Nguyen
(74) *Attorney, Agent, or Firm* — Osha Liang LLP

(57) ABSTRACT

A passive pen includes a pen body, and a tip disposed at a first end of the pen body. The tip capacitively couples to the pen body, and the capacitive coupling is configured to change the tip from a first ground mass state to a second ground mass state.

12 Claims, 18 Drawing Sheets

(56) References Cited

U.S. PATENT DOCUMENTS

| | | |
|---|---|---|
| 2013/0173211 A1 | 7/2013 | Hoch et al. |
| 2013/0181942 A1 | 7/2013 | Bulea et al. |
| 2013/0181943 A1 | 7/2013 | Bulea et al. |
| 2014/0015783 A1 | 1/2014 | Jeon |
| 2014/0043283 A1 | 2/2014 | Kim |
| 2014/0049703 A1 | 2/2014 | Hu |
| 2014/0132529 A1 | 5/2014 | Jeong |
| 2014/0132552 A1 | 5/2014 | Hoch et al. |
| 2014/0152623 A1 | 6/2014 | Lee et al. |
| 2014/0176495 A1 | 6/2014 | Vlasov |
| 2015/0070293 A1 | 3/2015 | Yu et al. |

\* cited by examiner

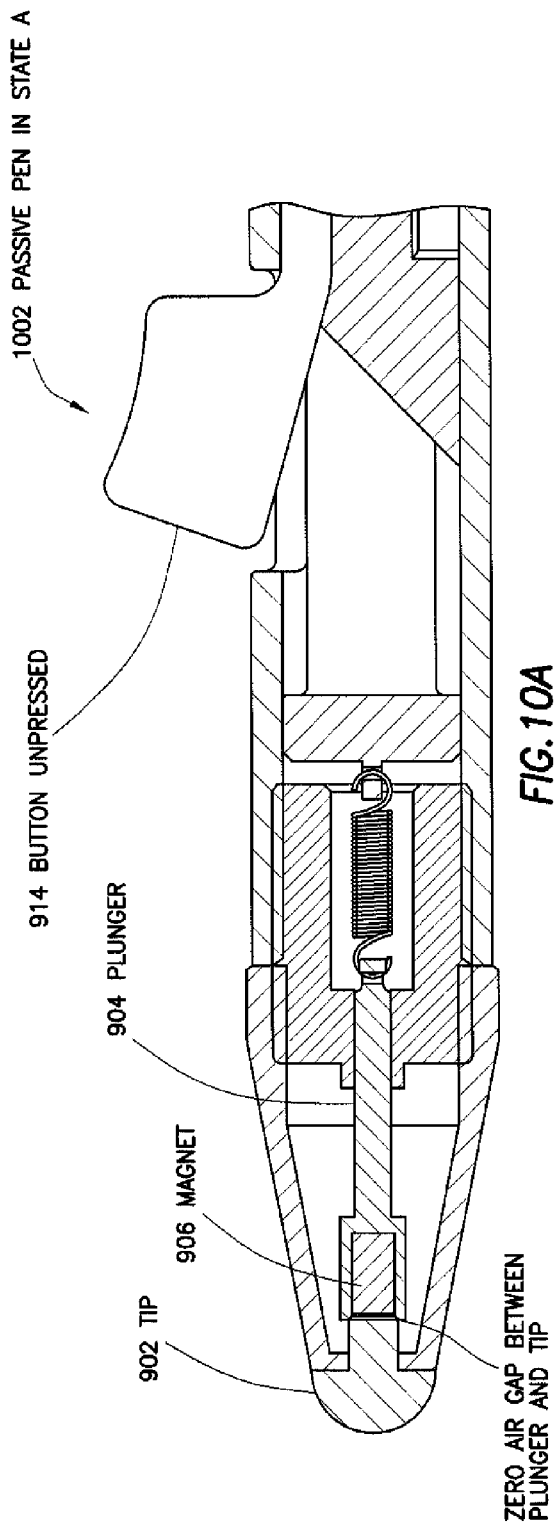
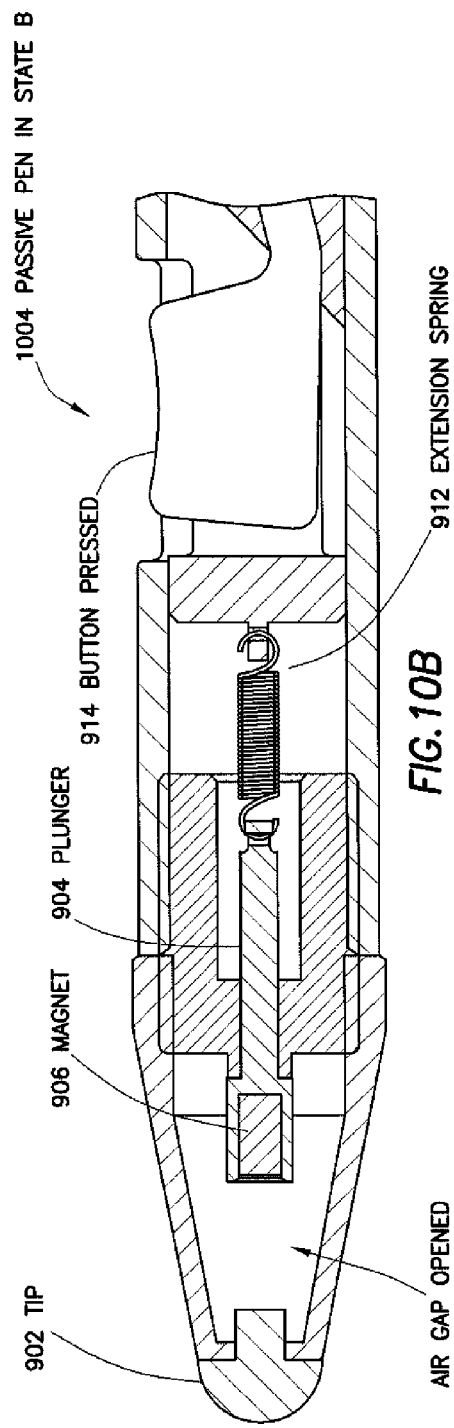
FIG. 10A
FIG. 10B

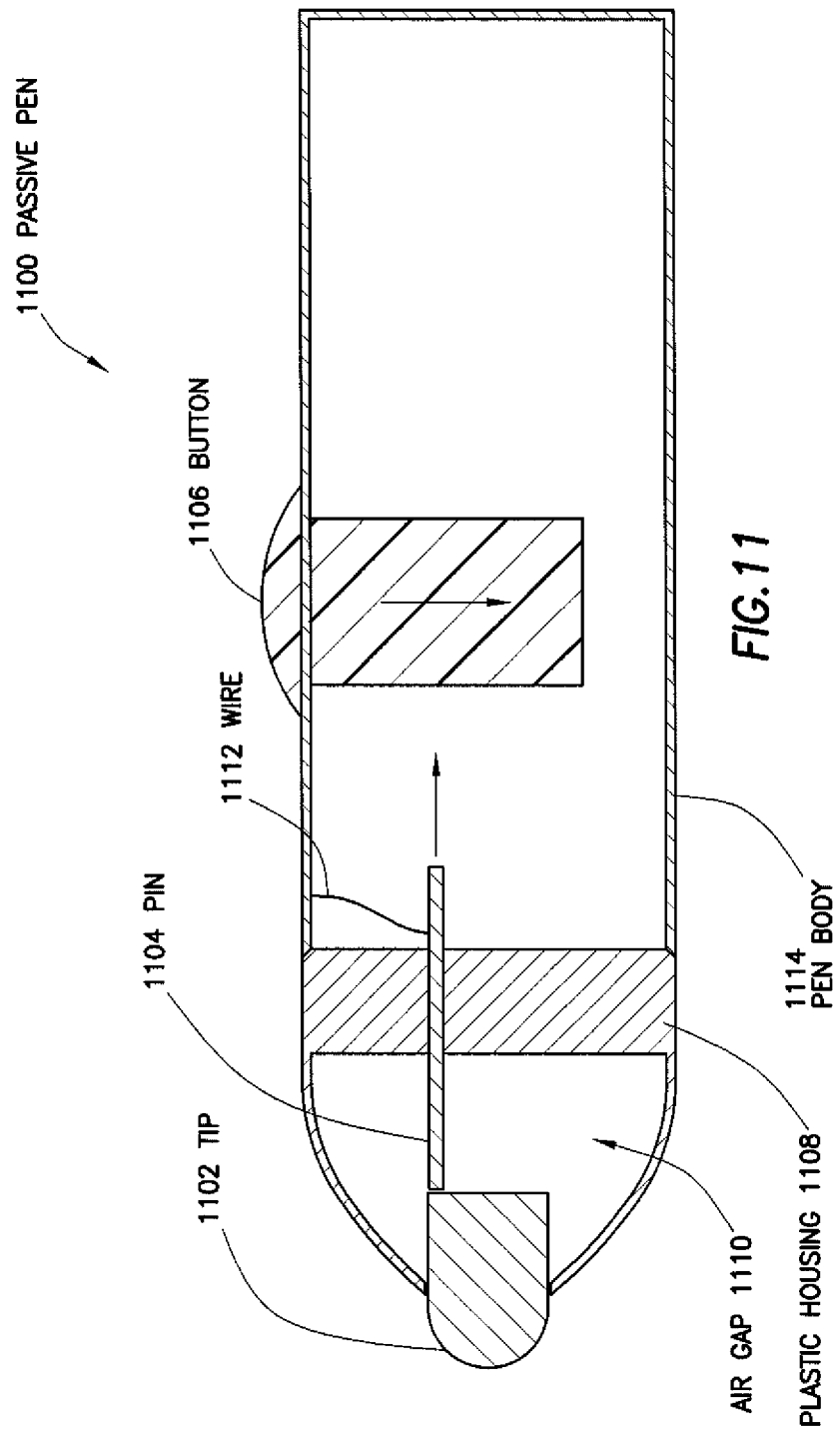

*2700 Example Reportable Events*

| Event | Initial Location of Passive Pen | Initial Capacitive Coupling State | Corresponding Initial Passive Pen Button State | User Action |
|---|---|---|---|---|
| 1 | Sensing Region | Default Ground Mass State | Button Not Selected | Select Button |
| 2 | Sensing Region | Modified Ground Mass State | Button Selected | Deselect Button |
| 3 | Sensing Region | Modified Ground Mass State | Button Selected | Remove Passive Pen from Sensing Region |
| 4 | Initial Detection on Sensing Region | Modified Ground Mass State | Button Selected at First Detection on Sensing Region | Deselect Button |
| 5 | Sensing Region | Default Ground Mass State | Button Not Selected | Remove Passive Pen from Sensing Region |
| 6 | Passive Pen Not on Sensing Region | Modified Ground Mass State | Button Selected | Put Passive Pen on Sensing Region |
| 7 | Passive Pen Not on Sensing Region | Default Ground Mass State | Button Not Selected | Put Passive Pen on Sensing Region |

PASSIVE PEN WITH GROUND MASS STATE SWITCH

CROSS-REFERENCE TO RELATED APPLICATIONS

This application claims priority under 35 U.S.C. §119(e) to U.S. Provisional Patent Application Ser. No. 61/992,800, filed on May 13, 2014 and entitled, "Passive Pen with Button" and to U.S. Provisional Patent Application Ser. No. 62/040,969, filed on Aug. 22, 2014 and entitled, "Passive Pen with Button." U.S. Provisional Patent Application Ser. No. 61/992,800 and U.S. Provisional Patent Application Ser. No. 62/040,969 are incorporated herein by reference in their entirety.

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments of the invention relate to a passive pen that includes a pen body, and a tip disposed at a first end of the pen body. The tip capacitively couples to the pen body, and the capacitive coupling is configured to change the tip from a first ground mass state to a second ground mass state.

In general, in one aspect, embodiments of the invention relate to a passive pen that includes a pen body, a tip disposed at a first end of the pen body, and a mechanical switch. The mechanical switch is for controlling a capacitive coupling of the tip to the pen body. The capacitive coupling is configured to switch from a first ground mass state to a second ground mass state upon activation of the mechanical switch.

In general, in one aspect, embodiments of the invention relate to a passive pen that includes a pen body, a tip disposed at an end of the pen body, and a selectable button. The selectable button is for controlling a capacitive coupling of the tip to the pen body. The capacitive coupling is configured to switch from a first ground mass state to a second ground mass state upon selection of the selectable button.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 7-22 show example passive pen configurations in accordance with one or more embodiments of the invention.

FIG. 27 shows an example reportable events table in accordance with one or more embodiments of the invention.

DETAILED DESCRIPTION

Figure 1:
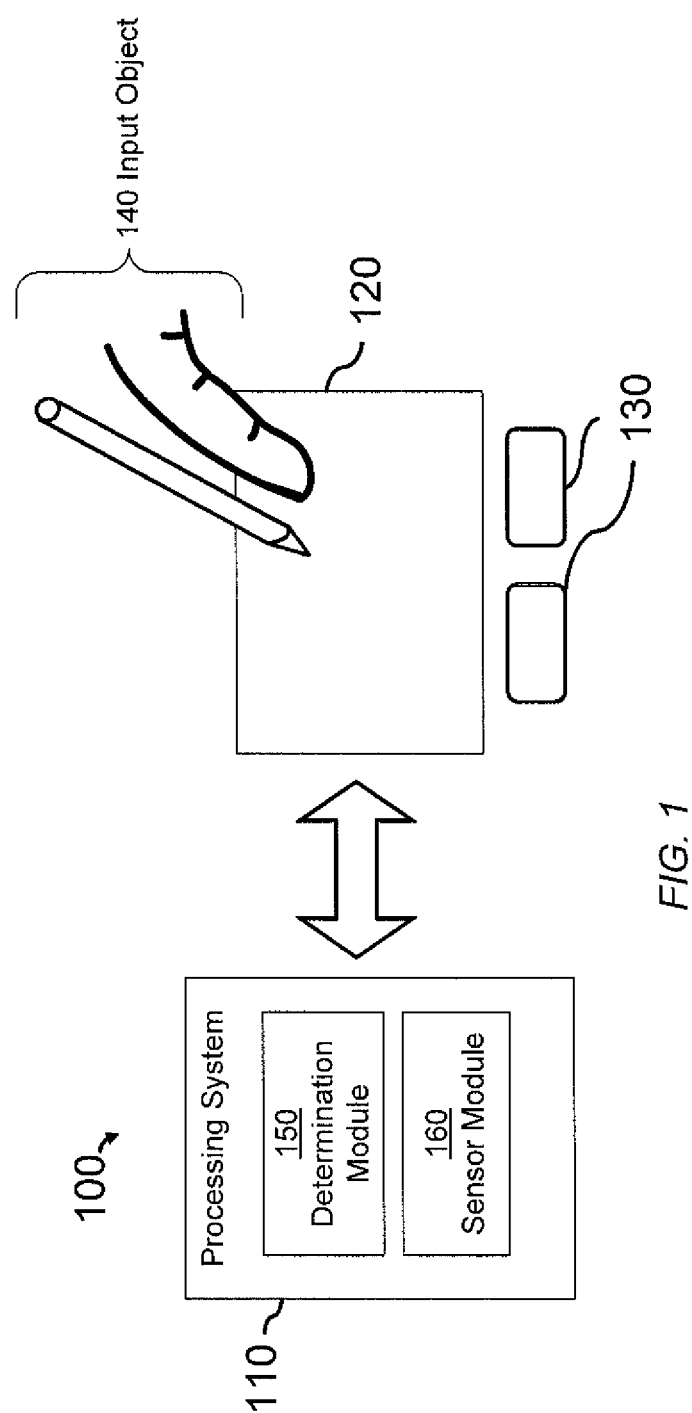
FIG. 1 shows a block diagram of an example system that includes an input device in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the invention are directed to a mechanical mechanism for changing a state of a passive pen. In particular, one or more embodiments of the invention incorporate a mechanical mechanism in the passive pen that mechanically changes a ground mass state of the passive pen. The mechanical mechanism is capable of being triggered by a user during use of the passive pen on an input device.

The ground mass state of the passive pen refers to the amount of capacitive coupling between the tip of the passive pen and the free-space. Free-space refers to the universe, such as air or a vacuum. In various embodiments, when the coupling between the tip and the universe (i.e., free-space coupling coefficient) is relatively small, the tip may be considered to be in a low ground mass state. However, when the coupling between the capacitive sensing device and the universe is substantially larger, the tip may be considered to be operating in a high ground mass state. The amount of capacitive coupling between the tip and free-space dictates the capacitive effects that the tip in the sensing region has on input device, and subsequently, the resultant measurement values. The amount of capacitive coupling for the low ground mass state is configurable. In particular, the capacitive coupling for the low ground mass state of the tip is designed such that the existence of the pen in the sensing region is distinguishable from noise (i.e., that the pen is detectible) and distinguishable from the tip being in high ground mass state. In one or more embodiments of the invention, the tip may change between three or more ground mass states.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include an input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the Specification, the singular form of input object is used. Although the singular form is used, multiple input objects exist in the sensing region (120). Further, the particular input objects that are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive. Measurements acquired using mutual capacitance sensing methods may be referred to as mutual capacitance measurements.

Regardless of whether mutual capacitance or absolute capacitance sensing methods are used, modulating the sensor electrodes may be referred to as driving the sensor electrode with varying voltage signals or exciting a sensor electrode. Conversely, sensor electrodes may be connected to a ground (e.g., system ground or any other ground). Connecting the sensor electrodes to a ground or holding electrodes substantially constant may be referred to as connecting the sensor electrodes to a constant voltage signal. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while in other embodiments receiver electrodes may be varying shapes and/or sizes.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and perform other operations.

The sensor module (160) may include functionality to drive the sensing elements to transmit transmitter signals and receive resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data, such as sensor signals and positional information, reporting modules for reporting information, and identification modules configured to identify gestures, such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information," as used herein, broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media readable by the processing system (110)). Additionally, the embodiments of the present invention apply equally, regardless of the particular type of medium used to carry out the distribution. For example, software instructions in the form of computer-readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

FIGS. 2-6 show example diagrams of a passive pen in accordance with one or more embodiments of the invention. A passive pen is type of input object that is used on capacitive sensing devices. The passive pen interacts with a capacitive sensing device by affecting the measured capacitance of the sensing device. In other words, a passive pen interacts with the input device in a way similar to how a finger interacts with the input device. In contrast to an active pen that sends an electrical signal to an input device using an internal power source, a passive pen does not utilize active components to transmit a signal to the sensing device. Rather, the only input to the capacitive sensing device is based on the detection, by the capacitive sensing device, of the passive pen. Therefore, in contrast to an active pen, a passive pen does not typically include a battery or other power source. A passive pen may also be referred to as a passive stylus.

In one or more embodiments of the invention, a passive pen does not include electrical components to interact with the input device. Thus, while the passive pen may include electrical components only for decorative aspects, such as to include a light, the passive pen exclusively interacts with the input device using mechanical components. In other embodiments, the passive pen excludes all electrical components. While embodiments of the disclosed invention are primarily described for use with a passive pen, active pens may also be utilized. That is, there is no reason that a ground mass state switch cannot be implemented in an active pen. However, a ground mass state switch may be more useful in situations involving passive pens due to their limited ability to actively communicate information to an input device besides basic positional information.

Figure 2:
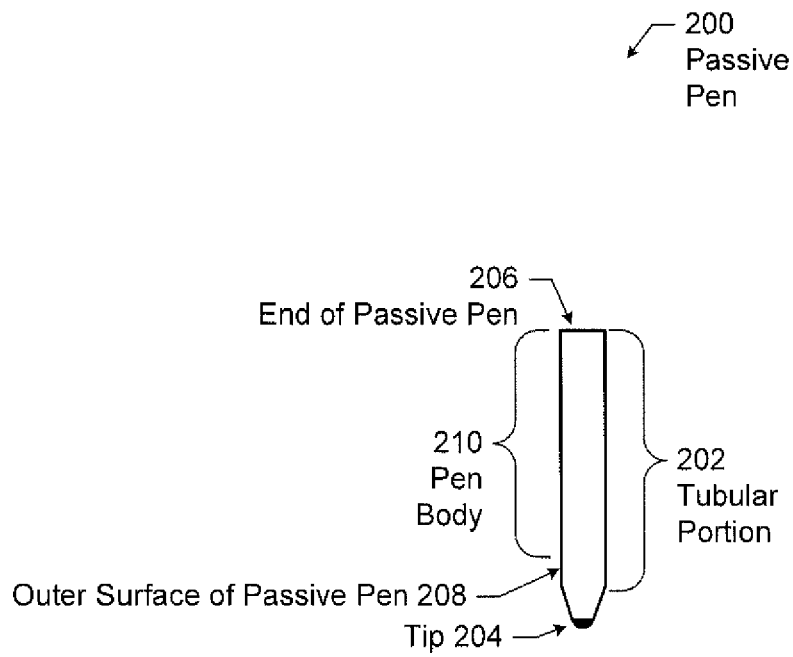
FIGS. 2-6 show example diagrams of a passive pen in accordance with one or more embodiments of the invention.

FIG. 2 shows an example diagram of a passive pen (200) in accordance with one or more embodiments of the invention. As shown in FIG. 2, the passive pen may be generally pen shaped. The passive pen (200) is designed to be held for contact on the surface sensing region. Being held for contact on the surface sensing region is when the pen is held by the user as pen, such as between the thumb and index finger, while resting on the middle finger, as with any pen or stylus. Other techniques for holding the passive pen for "writing" on the surface sensing region may be included without departing from the scope of the invention.

In some embodiments, the passive pen (200) may have a long tubular portion (202) having a cross section of virtually any shape and a tip (204) that is directly or indirectly physically connected to the tubular portion. For example, in the passive pen shown in FIG. 2, a canonical portion is physically disposed between the tip and the tubular portion, whereby the tip is at one end of the canonical portion and the tubular portion is disposed at the other end of the canonical portion. Although FIG. 2, shows a canonical portion, any shape portion may be disposed between the tip and the tubular portion.

The tip (204) may be disposed at a first end of the passive pen (200). The tip (204) is an end portion of the passive pen (200) that is designed to be in contact with the surface of the input device, and not to be in direct contact with the user when the user is holding the pen for contact on the surface. For example, the tip may be a millimeter or a few millimeters in size. Further, the tip may be made of conductive material, such as a metal or a conductive foam.

The outer surface of the passive pen (208) is an exterior portion of the passive pen that is capable of being touched by a user when the passive pen is assembled. In other words, the outer surface of the passive pen (208) may be an external housing.

The passive pen (200) also includes a pen body (210). The pen body (210) is a high ground mass object and/or is capable of being connected to a user. In one or more embodiments of the invention, the pen body (210) is made of a conductive material. For example, the pen body may be a metallic object within the passive pen. In an example in which the pen body is within the passive pen, the pen body may or may not be capable of being connected to the user via a conductive material when the passive pen is fully assembled. By way of another example, the pen body (210) may be a portion of the outer surface of the passive pen that is in contact with a user when the passive pen is held for contact on the surface of the sensing device.

The passive pen (200) may have a second end (206) that is opposite of the end in which the tip is stationed. The second end (206) may have a selectable button or other triggering mechanism (not shown) and discussed below. The button is selectable in that a user may select the button to activate the change in ground mass state. Alternatively or additionally, a selectable button or other triggering mechanism may be located on the outer surface of the pen body. For example, the selectable button or other triggering mechanism may be proximate to the tip. A component is proximate to the tip when the component is closer to the tip (204) than to the end (206).

Figure 3:
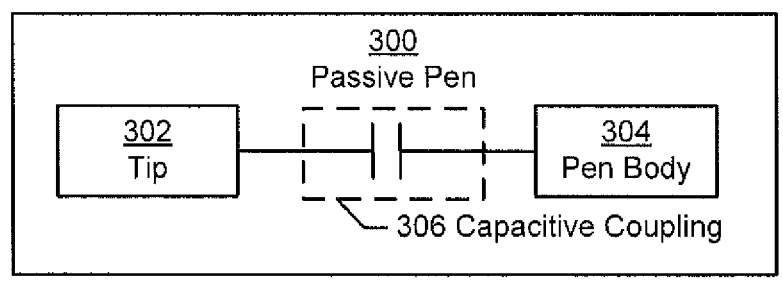

FIG. 3 shows an example block diagram of the passive pen (300) in accordance with one or more embodiments of the invention. The passive pen (300) may correspond to the passive pen shown in FIG. 2. As shown in the example block diagram of FIG. 3, the passive pen (300) includes a tip (302), a pen body (304), and a capacitive coupling (306) interposed between the tip (302) and pen body (304). The tip (302) and pen body (304) may each be made of conductive material.

The capacitive coupling (306) of the tip to the pen body is configured to change. For example, the capacitive coupling may switch from low capacitance, such as approximately one femtofarad (fF) or less capacitance, to high capacitance, such as approximately one picofarad (pF) or more. When the capacitance is a high capacitance, the ground mass state of the tip is greater than when the capacitance is of low capacitance. In other words, a change in the capacitive coupling (306) of the tip (302) to the pen body (304) changes the ground mass state of the tip (302). Although only two ground mass states are described, the passive pen may be configured to switch the tip between three or more ground mass states.

In one or more embodiments of the invention, the change in the capacitive coupling is created by a change in insulating material (not shown) that separates the pen body (304) from the tip (302). In other words, an insulating material may be interposed between the tip and pen body. The insulating material may be, for example, air, cotton, or any other material having high dielectric strength. The amount of insulating material or whether a conductive connection exists between the tip and pen body through the insulating material is dependent on the state of the capacitive coupling (306).

Figure 4:
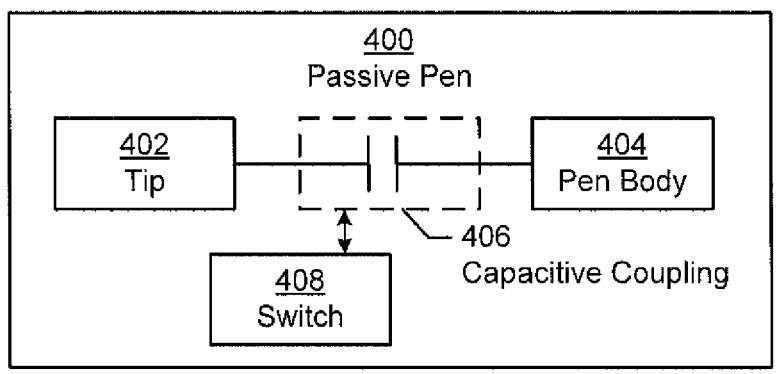

FIG. 4 shows another block diagram of the passive pen (400) in accordance with one or more embodiments of the invention. The passive pen (400) in FIG. 4 may include a tip (402), pen body (404), and capacitive coupling (406), similar to the passive pen in FIG. 3. However, as shown in FIG. 4, in some embodiments, the passive pen (400) includes a switch (408). The switch (408) is mechanically connected to the tip (402) and the pen body (404). The switch (408) is a mechanical component that is configured to mechanically change the capacitive coupling between the tip (402) and the pen body (404). In other words, the switch (408) includes functionality to increase and decrease the capacitive coupling (406) based on an activation of the switch. The switch has at least two states, where the state of the switch defines the amount of capacitive coupling between the tip and the pen body. In other words, the capacitive coupling is greater in one state than in the other state. In one or more embodiments of the invention, the switch (408) may be a single action switch or a double action switch. A single action switch is a switch that, upon a single activation or triggering, changes from a first state to a second state once and remains in the second state until activated again. A double action switch is a switch that, upon a single activation, changes from a first state to a second state and then back to the first state without another activation. In the double action switch, the default state of the switch may correspond to a high capacitive coupling state or a low capacitive coupling state. In one or more embodiments of the invention, the switch is controlled by an input control. The input control includes functionality to change the pulse width, or the duration of time in which the tip is configured to stay in the second ground mass state.

Figure 5:
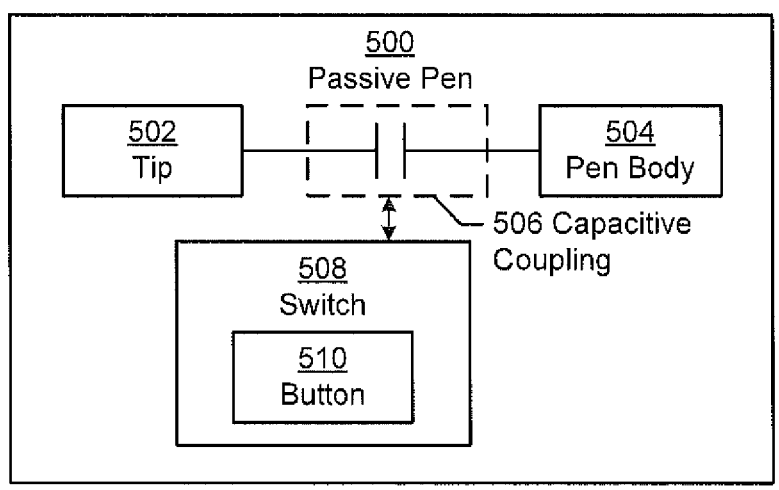

FIG. 5 shows another block diagram of the passive pen (500) in accordance with one or more embodiments of the invention. The passive pen (500) in FIG. 5 may include a tip (502), pen body (504), capacitive coupling (506), and switch (508) similar to the passive pen in FIG. 4. As shown in FIG. 5, in some embodiments, the switch (508) includes or is connected to a button (510). The button (510) is a physical selectable component that allows a user to trigger a state change of the switch (508). In some embodiments, the button is compressible. In other words, at least a part of the button may physically move in order for a user to physically select the button. In other embodiments, the button is non-compressible. For example, a user merely placing a finger over the button may be a selection of the button. In one or more embodiments of the invention, the button is located on the outer surface of the passive pen. For example, the button may be located on the tip, any part of the tubular portion, on the end of the passive pen, or on any other part of the passive pen.

Figure 6:
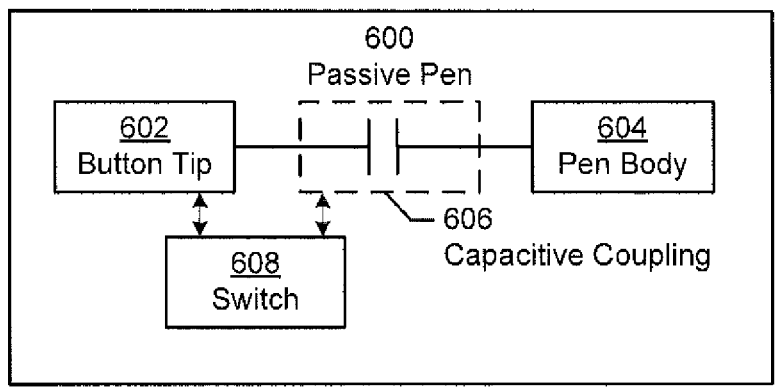

FIG. 6 shows an example of a passive pen (600) in which the tip of the passive pen is a button tip (602) that is connected to the switch (608). The button tip (602) may be a selectable button that changes position relative to the position of the pen body (604). As with the tip (502) in FIG. 5, the button tip (602) is capacitively coupled (606) to the pen body (604). In other words, a selection of the button tip (602) activates the switch (608), which changes the capacitive coupling (606) between the button tip (602) and the pen body (604).

Various techniques may be used to implement the various configurations of the passive pen. FIGS. 7-22 show example passive pen configurations in accordance with one or more embodiments of the invention. FIGS. 7-22 are only examples and not intended to limit the scope of the invention.

Figure 7:
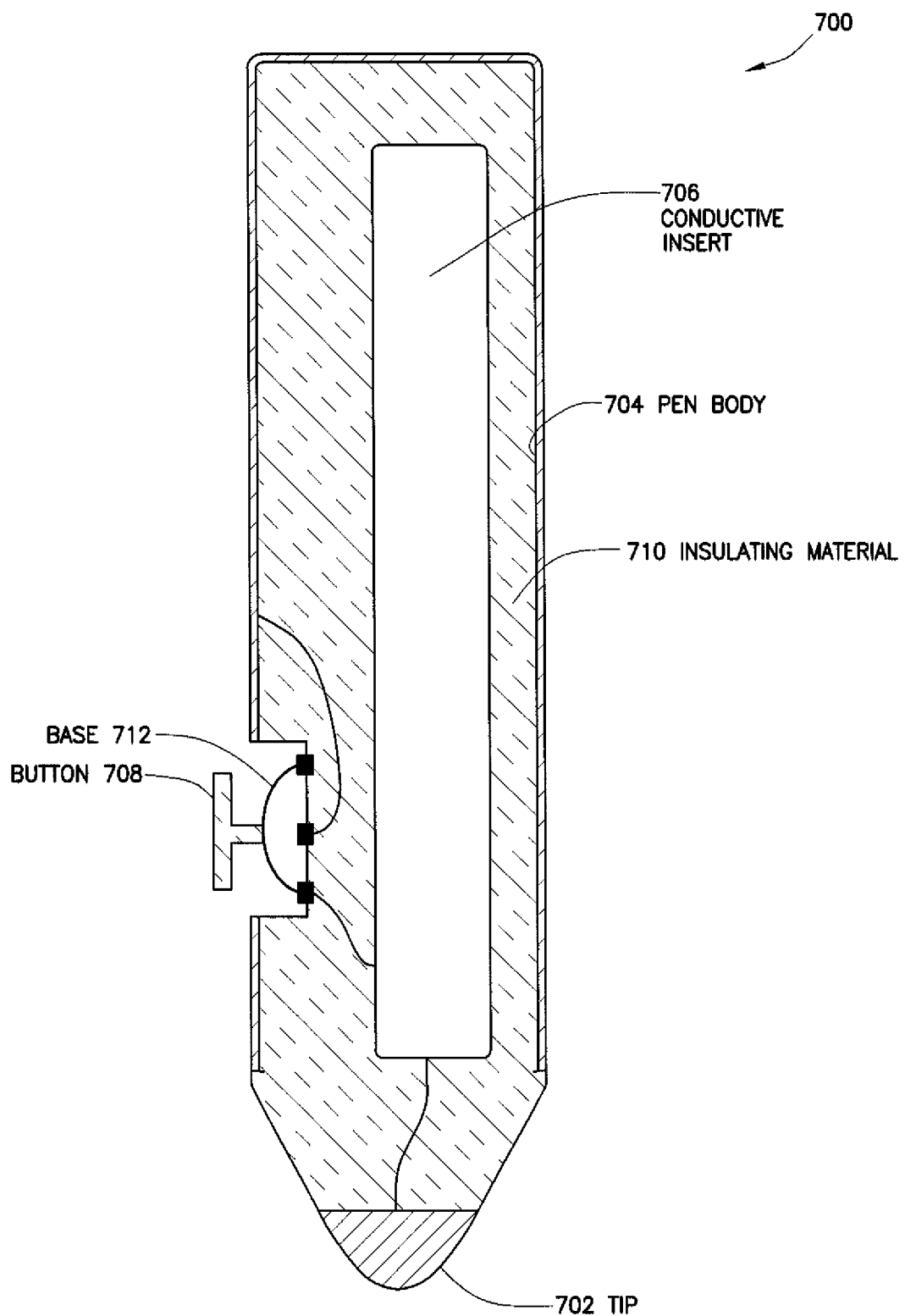

In the diagram in FIG. 7, a tip (702) made of conductive material is connected to a conductive insert (706) via a wire, which is also made of conductive material. The conductive insert (706) may be any size, such as larger, the relative size shown, or smaller (e.g., the size of the tip). The pen body (704) is an outer surface of the passive pen (700) and is made of conductive material. When the user holds the pen, the user is capacitively coupled to the pen body (704). Insulating material (710) surrounds the conductive insert (706) and separates the conductive insert (706) from the pen body (704). The insulating material (710) also separates the tip (702) from the pen body (704). A wire connects the button (708) to the conductive insert (706). Another wire, with an endpoint underneath the button (708), selectively connects the base (712) of the button (708) to the pen body (704). The base (712) is also made of conductive material. Further, the button (708) is a switch.

The button (708) is compressible. When not compressed, the tip is not capacitively connected to the pen body (704) through the conductive insert (706) and wires. Specifically, the insulating material (710) separates the tip (702) from being capacitively coupled to free space. As used herein, the term "free space" refers to air or a vacuum. Thus, the tip (702) is in a low ground mass mode, and the passive pen (700) is a low ground mass object. When compressed, the tip (702) is capacitively coupled through the wires, conductive insert (706), base (712), and pen body (704) to the user and, subsequently, to free space. Thus, the tip (702) and, subsequently, passive pen (700) appears as a high ground mass object when the button (708) is compressed.

Figure 8:
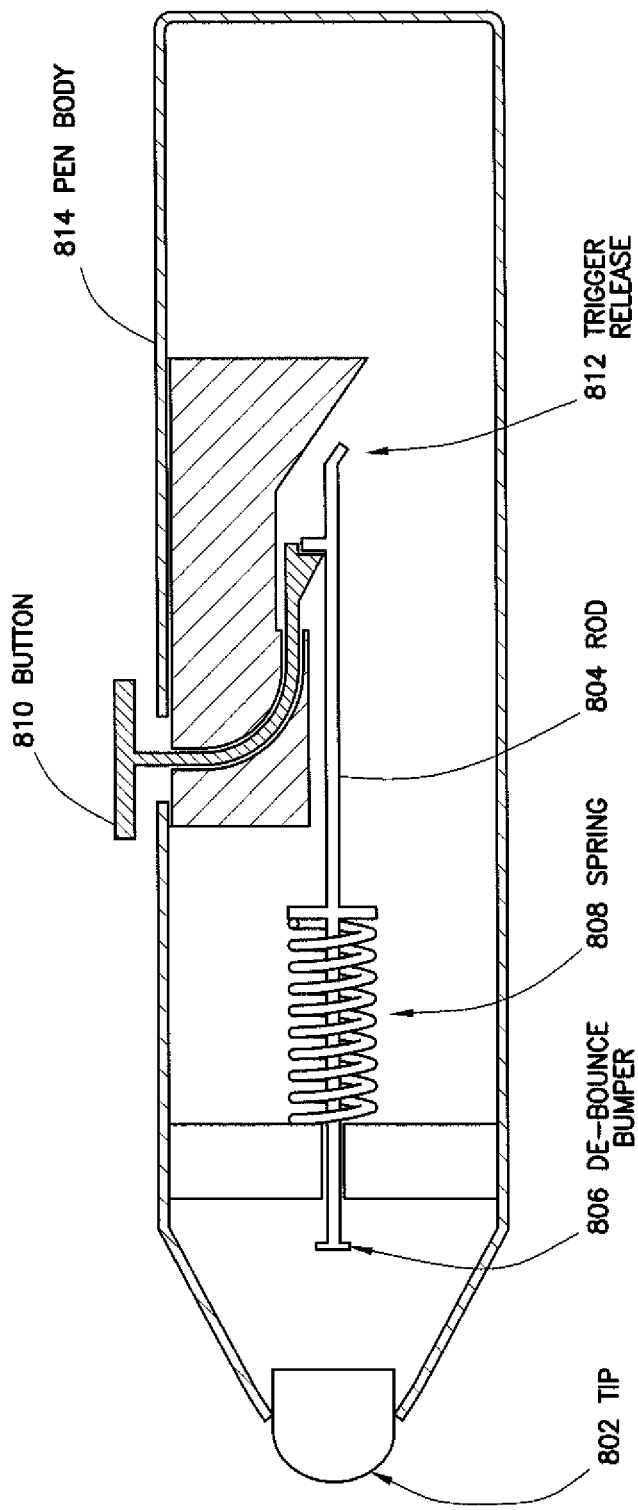

FIG. 8 shows another example of a passive pen configuration in accordance with one or more embodiments of the invention. A shown in FIG. 8, the example passive pen (800) includes a tip (802), a rod (804) with a de-bounce bumper (806) at an end, a spring (808), a button (810), a trigger release (812), and a pen body (814) in accordance with one or more embodiments of the invention. The tip (802), rod (804), and pen body (814) are made of conductive material. The button is compressible. When not compressed, the de-bounce bumper (806) is connected to the tip (802) and the passive pen (800) is in a high ground mass state by connecting the tip to free space through the pen body (814) and user. When compressed, the tip (802) separates from the rod (804) and de-bounce bumper (806). The separation decouples the tip from the pen body (814). Thus, the tip (802) is in a low ground mass state. Upon a subsequent selection of the button (810), when the tip (802) is in the low ground mass state, the trigger release (812) releases the rod (804) and spring (808) applies a force to the rod (804), such that the force causes the de-bounce bumper (806) to reconnect with the tip (802) in accordance with one or more embodiments of the invention.

Figure 9:
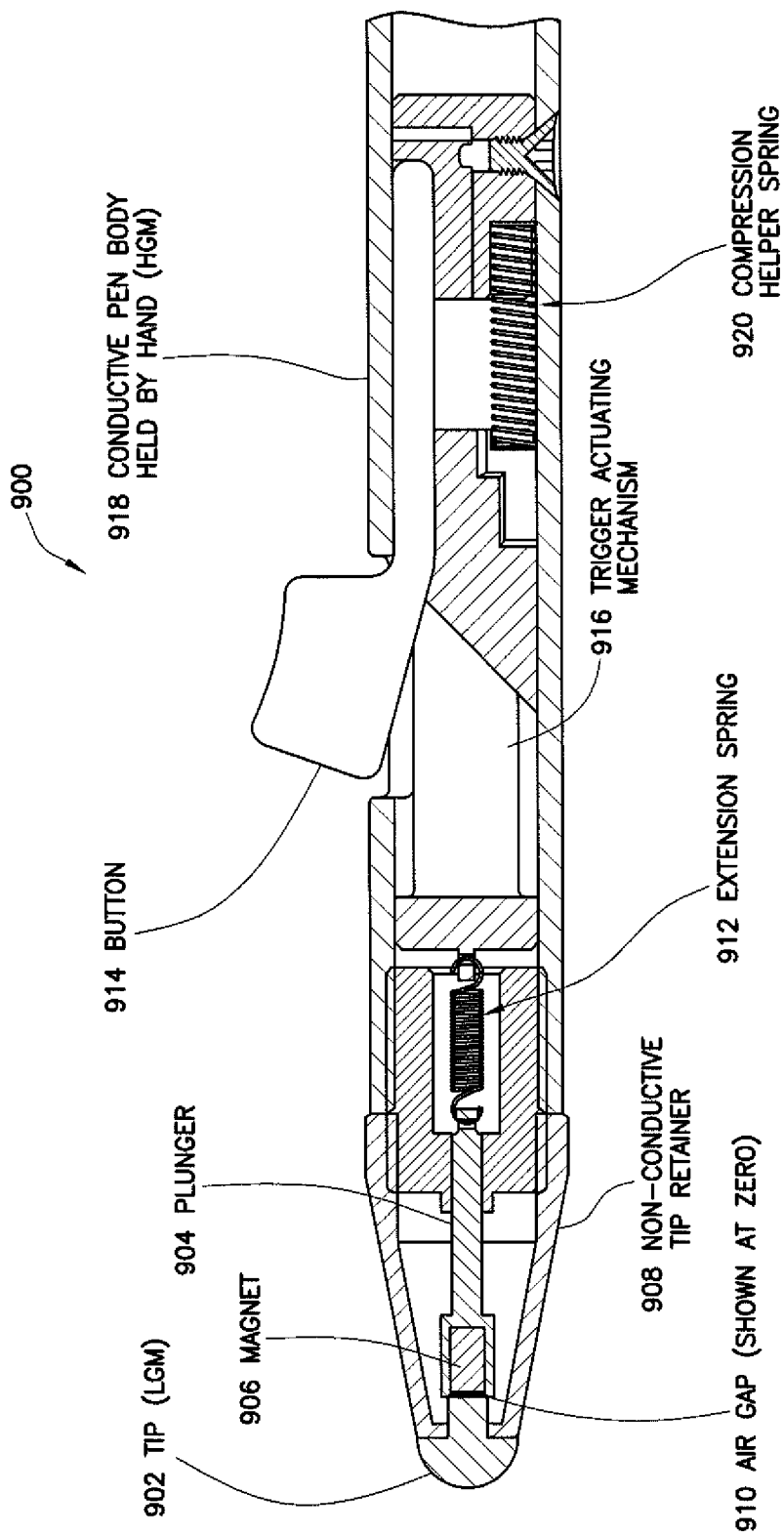

FIGS. 9 and 10 show another example configuration of the passive pen (900) in accordance with one or more embodiments of the invention. As shown in FIG. 9, the passive pen (900) includes a tip (902), plunger (904) with a magnet (906) at one end and an extension spring (912) at the other end. On the other side of the extension spring (912) is a trigger actuating mechanism (916) that is connected to the button (914). The trigger actuating mechanism (916) is also connected to a compression spring (920). The external portions of the passive pen (900) include a conductive pen body (918) with the button (914), tip (902), and a non-conductive tip retainer (908). The non-conductive tip retainer (908) separates the tip (902) from the pen body (918).

The plunger (904), extension spring (912), trigger actuating mechanism (916), and pen body (918) are made of conductive material. Depending on the state of the capacitive pen, an air gap (910) may separate the tip from the plunger (904) and, thus, capacitively separate the tip (902) from the user.

FIG. 10 shows the capacitive pen in FIG. 9 in two states (e.g., passive pen in state A (1002) and passive pen in state B (1004)) in accordance with one or more embodiments of the invention. In the passive pen in state A (1002), the button (914) is not pressed. The magnet (906) keeps the plunger (904) connected to the tip (902). Thus, zero air gap exists between the plunger (904) and the tip (902) when the button (914) is not pressed. Accordingly, the tip (902) is in a high ground mass state.

As shown in the passive pen in state B (1004), when the button (914) is pressed, the extension spring (912) pulls on the plunger (904). When the force of the extension spring (912) exceeds the magnetic force of the magnet (906), the plunger (904) is quickly pulled away from the tip (902) creating a non-zero air gap (910) between the tip (902) and the rest of the passive pen (1004). The non-zero air gap reduces the capacitive coupling between the tip and the pen body. Thus, the tip (902) changes to a low ground mass object and appears as a low ground mass object to the input device.

Although not shown, when the button is released by the user, force from the compression helper spring pushes the trigger mechanism, such that the plunger is forced back to a default position in which the plunger is connected to the tip and zero air cap exists. The passive pen shown in FIGS. 9 and 10 has a double action switch, which is the combination of the magnet, plunger, triggering mechanism, and spring. Further, the springs and magnet in the passive pen shown in FIGS. 9 and 10 causes the tip to switch quickly from the high ground mass state to the low ground mass state, and then back to the high ground mass state. By quickly switching, the input device is able to detect the change in the ground mass state as an intentional state selection by the user rather than an unintentional ground mass state change of the input device. The quickness of the change is dependent on the configuration of the passive pen. The fastest change that is possible to achieve is desired in one or more embodiments of the invention.

FIG. 11 shows another example configuration of a passive pen (1100) in accordance with one or more embodiments of the invention. The passive pen (1100) in FIG. 11 has a metal tip (1102) held in a hollow plastic housing (1108). The metal tip (1102) may be, for example, five millimeters in diameter and is a low ground mass object. Other sizes of tips and tip materials that are conductive may be used to create a tip, which, in isolation, is a low ground mass object. The hollow plastic housing (1108) is attached to a pen body (1114) that is made of a conductive material.

The pen body (1114) is connected to a wire (1112). The wire (1112) connects a pin (1104) to the pen body (1114). The pin (1104) is configured to move between a position in which an end of the pin (1104) is connected to the tip (1102) and a position in which the end is not connected to the tip (1102). When the end is connected to the tip (1102) and a user is holding the pen (1100) by way of the pen body (1114), the tip (1102) is a high ground mass object. In other words, the tip (1102) is capacitively coupled to free space by way of the user, wire (1112), and pin (1104). When the end is not connected to the tip, a sufficient air gap, such as five millimeters, exists between the pin (1104) and the tip (1102) that the tip (1102) is a low ground mass object. In various other embodiments, this distance may be greater or less than five millimeters, such that the distance effectively eliminates the capacitive coupling between the decoupled conductive objects. In other words, the tip (1102) is not capacitively coupled to the user even when the user is holding the pen body (1114).

A compressible button (1106) may be positioned in the pen body (1114). The button may be connected to a switch (not shown) that is configured to switch the pin (1104) between the position in which the end of the pin (1104) is connected to the tip (1102) and the end of the pin (1104) is not connected to the tip (1102). The switch may include springs and other mechanical components to cause the pin to change positions. In some embodiments, when the button is pressed, the tip (1102) is a low ground mass object. In other embodiments, when the button is pressed, the tip (1102) is a high ground mass object.

Figure 12:
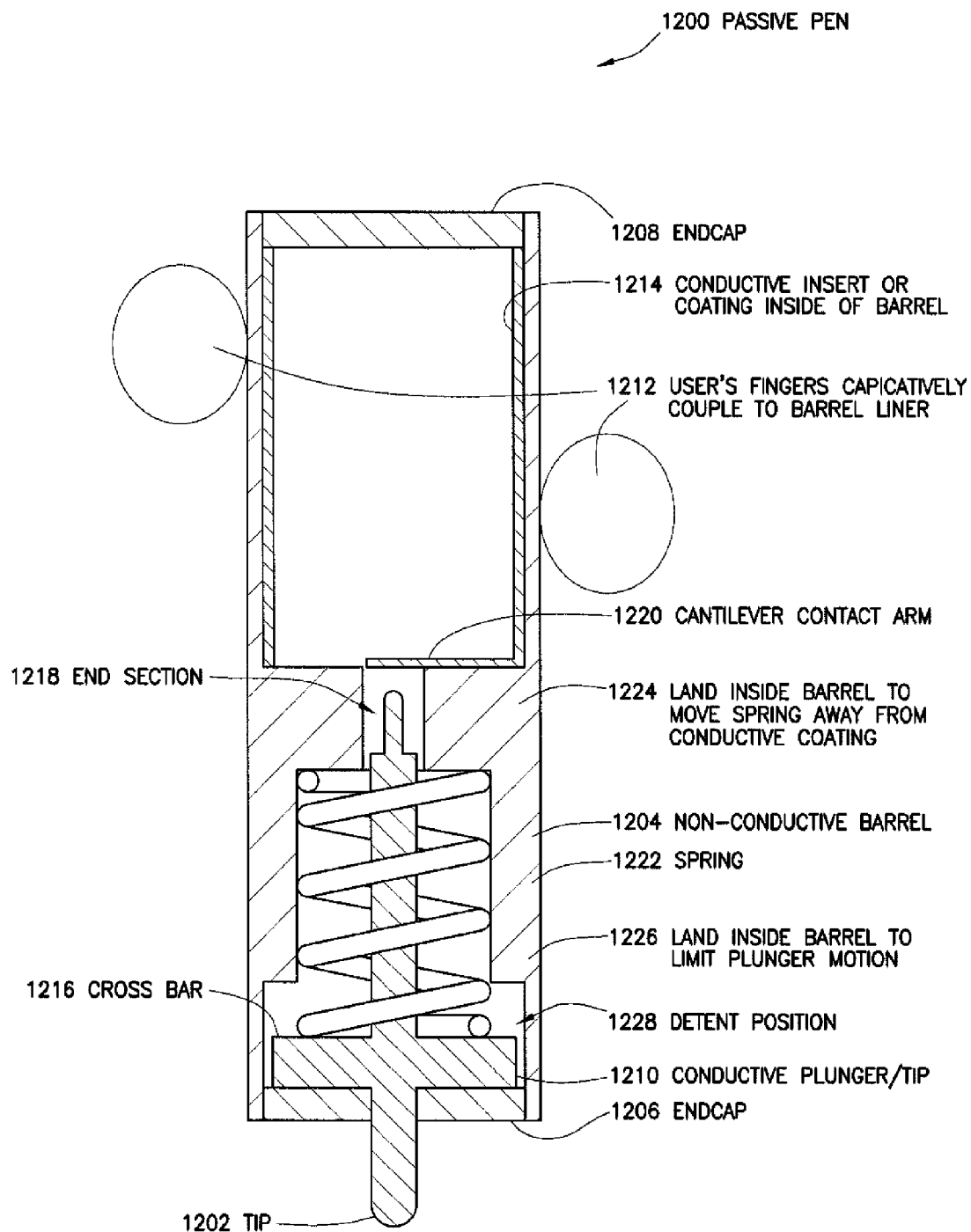

FIG. 12 shows an example configuration of a passive pen (1200) in which the tip (1202) is also a button. As shown in FIG. 12, the passive pen (1200) may include a barrel (1204) with an endcap (1206) on the end of the barrel (1204) proximate to the tip (1202) and an endcap (1208) on the opposing end of the barrel (1204). In one or more embodiments of the invention, the barrel (1204) is made of non-conductive material. The barrel may be one piece as shown, or could be multiple pieces that for example, screw together. For two pieces, the top piece may be conductive and the bottom piece non-conductive.

The tip (1202) may be an end portion of a plunger (1210) that is made of conductive material and is housed in the barrel (1204). Specifically, the plunger (1210) may include a tip (1202) at one end, a mid-section cross bar (1216), and an end section (1218). The plunger (1210) may be made of conductive material and may be a low ground mass object.

The passive pen (1200) may include, at least at the portion in which a user's fingers (1212) are stationed when the pen is held, a conductive region. The conductive region may be a conductive insert or a conductive coating (1214) inside the barrel (1204), may be a grip or coating outside the barrel (1204) or may be a part of the barrel (1204). When inside, as in the embodiment shown, the conductive portion on the inner surface of the barrel has good coupling to the user's finger on the outside of the barrel because of the large area of finger contact, and the likely high dielectric constant of the non-conductive material of the barrel. The conductive region connects or includes a cantilever contact arm (1220) for selectively connecting to the end section (1218) of the plunger (1210).

In one or more embodiments of the invention, the cantilever contact arm (1220) and end section (1218) are both sized to reduce unwanted open-circuit capacitance. In other words, the sizes of the cantilever contact arm (1220) and end section (1214) are small enough to minimize the capacitive coupling between the plunger (1210) and the conductive region when the cantilever contact arm (1220) and end section (1214) are not physically connected for low ground mass mode.

The passive pen (1200) may also include a spring (1222) around the plunger (1210) that assists in switching the tip (1202) between a high ground mass object and a low ground mass object. In one or more embodiments of the invention, the spring (1222), cross bar (1216), and end section (1218) form a switch. In some embodiments, the switch is a double action switch that changes the tip (1202) from a high ground mass object to a low ground mass object and back to a high ground mass object, or from a low ground mass object to a high ground mass object and back to a low ground mass object, depending on how hard the user presses and spring constant of the spring (1222).

Returning to the barrel (1204), the barrel may include a land (1224) to separate the spring from the cantilever contact arm (1220) and a land (1226) to keep the cross bar (1216) within a position such that the tip (1202) remains exposed when the tip (1202) is in a high ground mass state. Although not shown, the barrel (1204) may include a detent at the detent position (1228) to resist the cross bar (1216) from unintentional moving, such that the tip (1202) is unintentionally changed to the high ground mass state. Alternatively or additionally, the cross bar (1216) and endcap (1206) may be made of magnetic and ferromagnetic material to attract each other and, thereby, apply a force to keep the tip in a low ground mass state. In other words, either the cross bar or the endcap may be made of magnetic material.

The embodiment shown in FIG. 12 may be inverted such that when the tip of the pen is not depressed (e.g., not clicked or otherwise selected) the conductive tip is coupled to the user and when the pen is depressed, the conductive tip is decoupled from the user.

In the embodiment shown in FIG. 12, when the tip (1202) is pressed with moderate to light force, the magnetic force holds the plunger in the open-switch arrangement, preventing unwanted or erratic actuation of the switch. However, when the tip (1202) is pressed with sufficient force, the plunger disengages from the magnet, providing tactile feedback and hysteresis.

Figure 13:
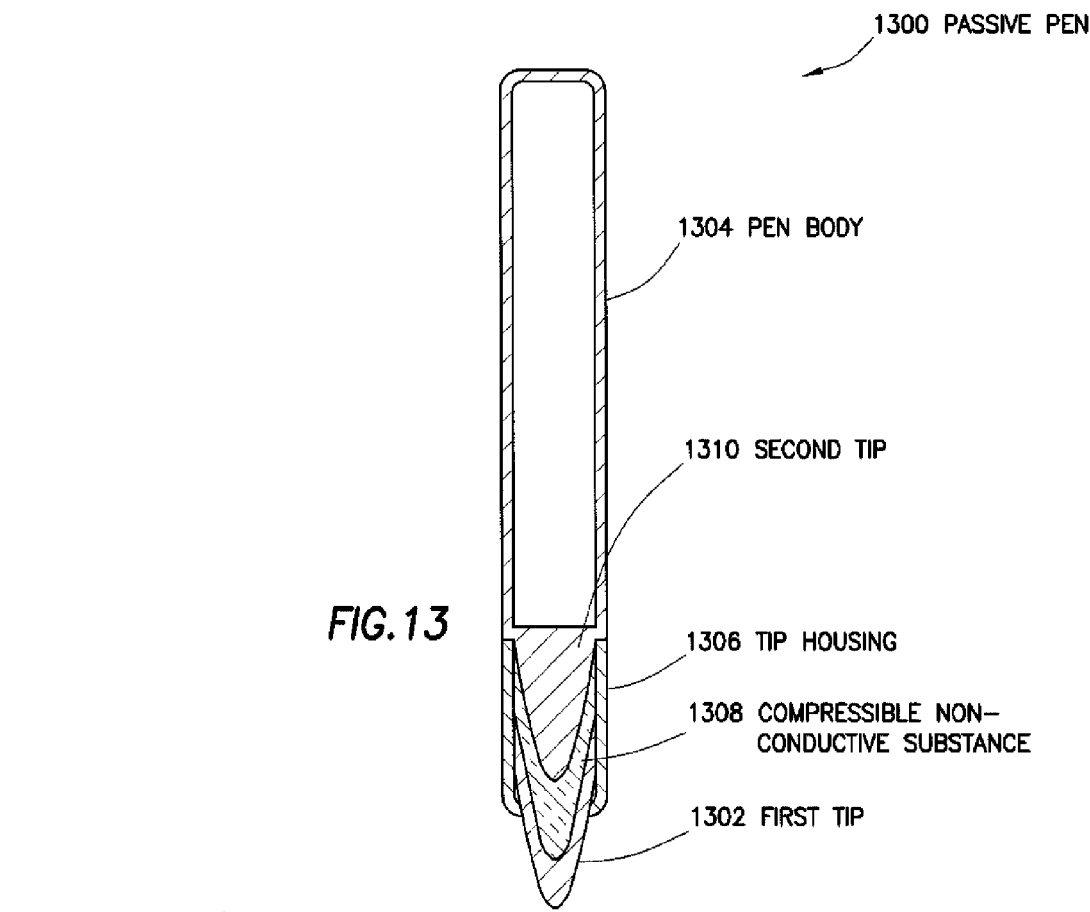

FIG. 13 shows another example configuration of passive pen (1300) in accordance with one or more embodiments of the invention. In the example configuration, the passive pen (1300) includes a first tip (1302) held in a tip housing (1306). The tip housing (1306) is made of non-conductive material. The first tip (1302) is separated from a second tip (1310) by compressible non-conductive substance (1308). The compressible non-conductive substance (1308) is any material that is insulating and capable of being compressed. The second tip (1310) is directly connected to or part of a pen body (1304) that is attached to the tip housing (1306). The pen body (1304), second tip (1310), and first tip (1302) are all made of conductive material, such as a metal.

When the compressible non-conductive substance (1308) is not compressed, the first tip (1302) is in a low ground mass state and appears as a low ground mass object. When the compressible non-conductive substance (1308) is compressed, the first tip (1302) is proximate to the second tip (1310), such that a capacitive coupling is created between the first tip and the second tip, and, subsequently, a user's fingers through the pen body (1304). Thus, when the compressible non-conductive substance (1308) is compressed, the first tip (1302) is in a high ground mass state and appears as a high ground mass object.

In some embodiments, the varying level of capacitive coupling to the pen tip may be detected by the input device. Based on the measure of capacitance, the downward force being applied on the tip of the pen can be determined. Some embodiments useful for force detection include a compressible non-conductive substance as in FIG. 13. Since the pen tip does not stay only at binary HGM and LGM capacitive coupling levels, intermediate levels can be recognized by the input device in order to calculate a force that is being applied to compress the compressible non-conductive substance.

Figure 14:
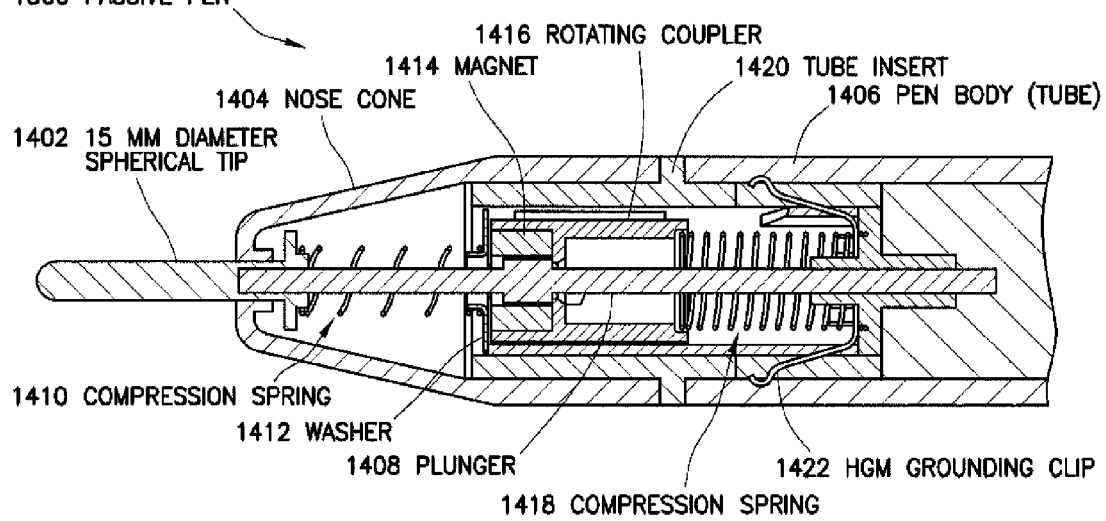

FIGS. 14-21 show another example configuration of a passive pen (1400) in accordance with one or more embodiments of the invention. The example configuration shown in FIGS. 14-21 may constrain and\or minimize an amount of time spent in low ground mass state. In low ground mass state, the signal is lower and, thus, tracking of pen location or lateral movement may be more challenging in some embodiments. Thus, by constraining and\or minimizing an amount of time in low ground mass state, the overall performance of the pen may improve. FIG. 14 is a component diagram of the example configuration. As shown in FIG. 14, the passive pen (1400) may include tip (1402), which is made of conductive material, held in a nose cone (1404) as the tip housing. The nose code (1404) made of non-conductive material may be attached to a pen body (1406), which is made of conductive material. Inside the passive pen (1400), the tip (1402) may be connected to a plunger (1408). The tip (1402) may be a compressible button to change between a low ground mass state and a high ground mass state. The change may be performed using a first compression spring (1410), washer (1412), magnet (1414), rotating coupler (1416), second compression spring (1418), grounding clip (1422), and tube insert (1420) as described below with reference to FIGS. 15-21. In particular, the size of the air gap between the washer (1412) and the magnet (1414) and rotating coupler (1416) define whether the tip (1402) is in a high ground mass state by being capacitively coupled to free space via a user or in low ground mass state.

Figures 15, 16:
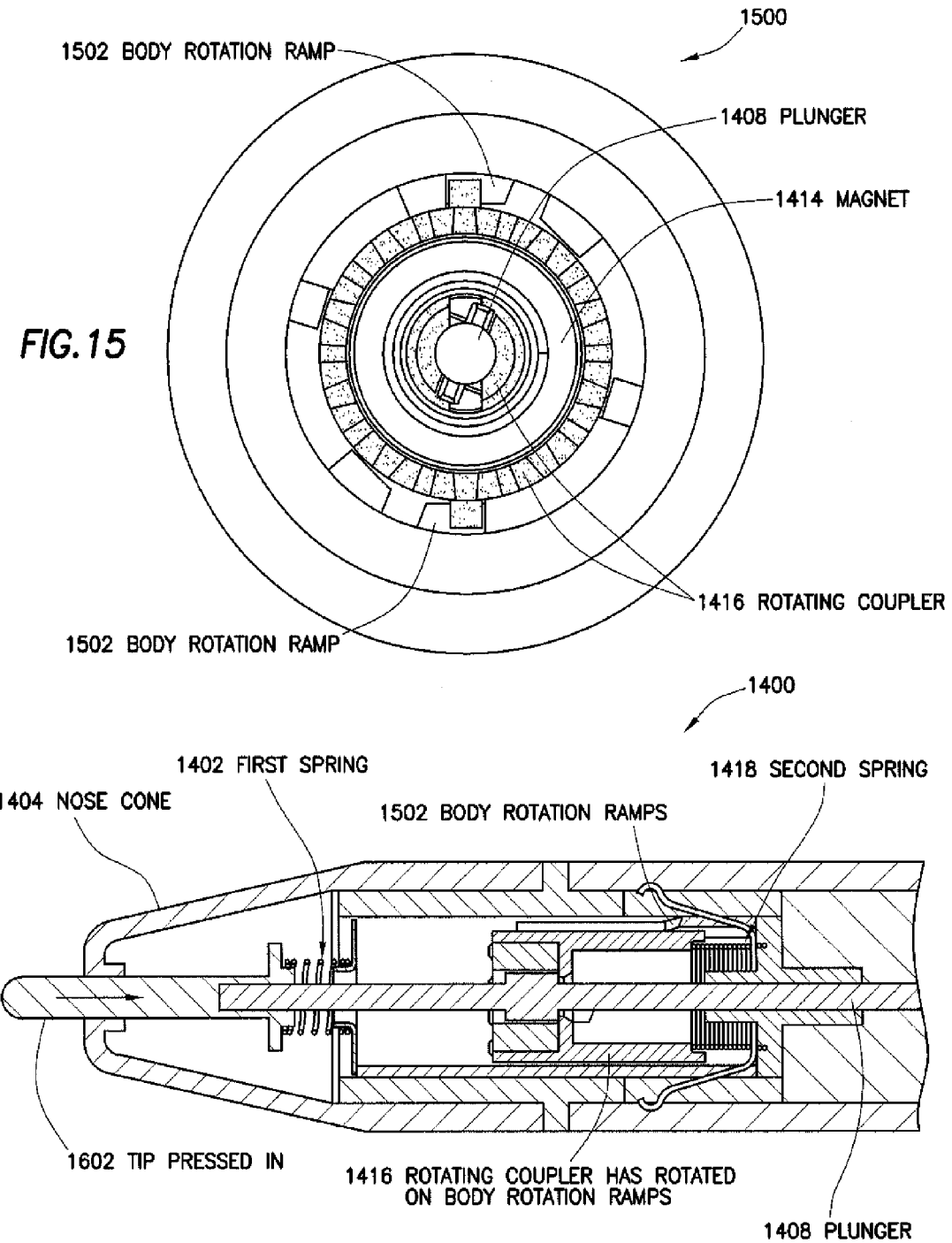

FIG. 15 shows a cross section view (1500) of the example configuration of the passive pen shown in FIG. 14 in accordance with one or more embodiments of the invention. Specifically, the view (1500) shown in FIG. 15 is looking down the passive pen from the tip. The tip, nose cone, and washer are not shown in FIG. 15. As shown in FIG. 15, when the tip is pressed in, the plunger (1408) pushes a rotating coupler (1416) and magnet (1414) both up and away from a washer (not shown). The air gap between the rotating coupler (1416) with magnet (1414) and washer begins to increase from the initial substantially nonexistent air gap distance. As the rotating coupler (1416) and magnet (1414) separate from the washer, the rotating coupler (1416) approaches the body rotation ramps (1502).

FIG. 16 shows the example configuration of the passive pen (1400) shown in FIG. 14, with the tip pressed. As shown in FIG. 16, as the tip (1602) is pressed in, the force being applied exceeds the magnetic bond between the magnet (1414) and washer (1412) resulting in the magnet (1414) releasing and the tip (1602) plunging rapidly into the nose cone (1404). The air gap quickly grows to maximum air gap distance, such as five millimeters.

Figure 17:
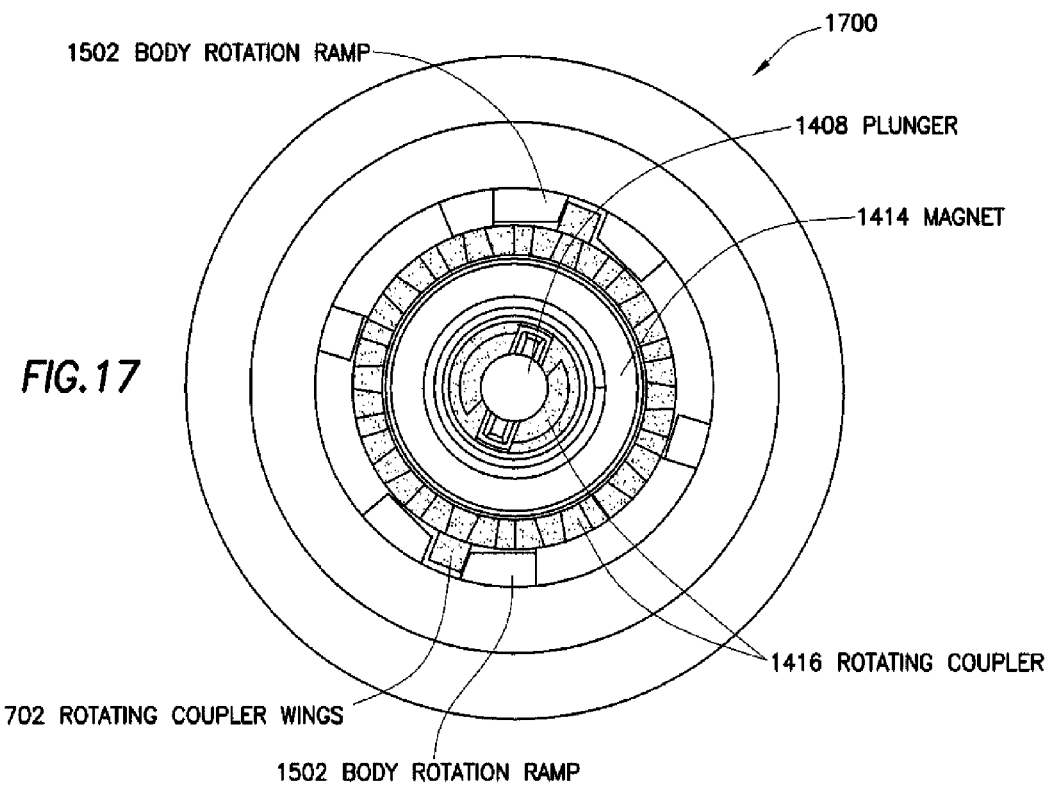

FIG. 17 shows a cross section view (1700) of the passive pen shown in FIG. 14. Specifically, FIG. 17 shows a cross section view with the tip (not shown) pressed in. The tip, nose cone, and washer are not shown in FIG. 17. As the rotating coupler (1416) is pushed into the body, the rotating coupler wings (1702) contact the body rotation ramps (1502) causing the rotating coupler (1416) to rotate clockwise. The clockwise rotation causes alignment between the hole in the rotating coupler (1416) and wings on the plunger (1408). At this point, the plunger (1408) is no longer holding the rotating coupler (1416) against the compressed spring (1418).

Figure 18:
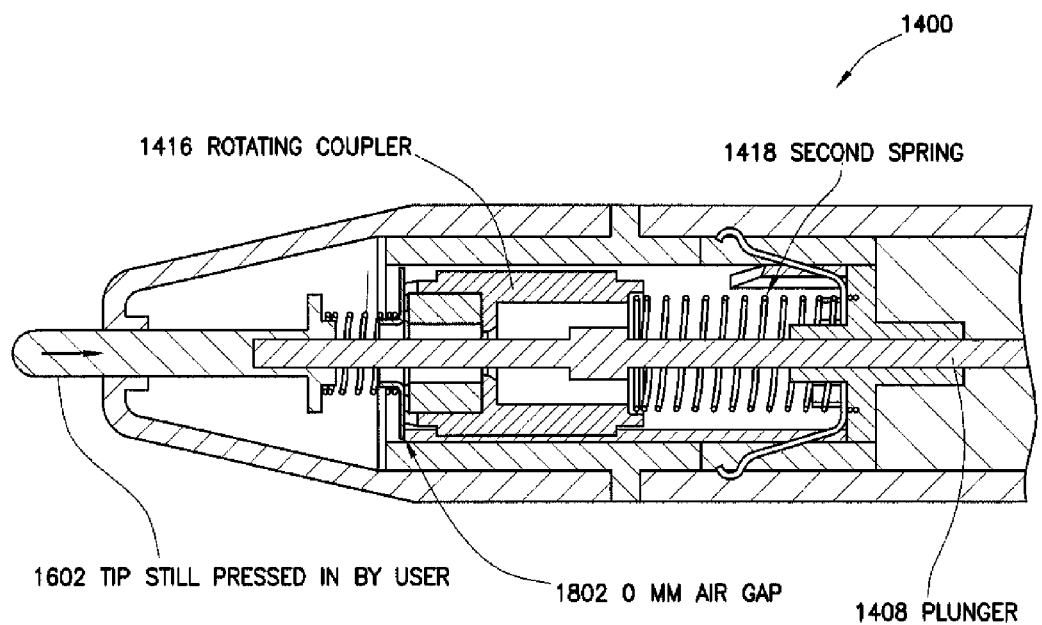

FIG. 18 shows an additional state of the example configuration of the passive pen (1400) shown in FIG. 14 with the tip pressed in (1602). As shown in FIG. 18, the rotating coupler (1416) slips off the plunger (1408) and the second spring (1418) expands. The second spring (1418) expanding forces the rotating coupler (1416) to move toward the tip (1602). The air gap distance returns from the maximum distance to substantially zero rapidly (1802). In one or more embodiments of the invention, the user may not have yet released the tip.

Figure 19:
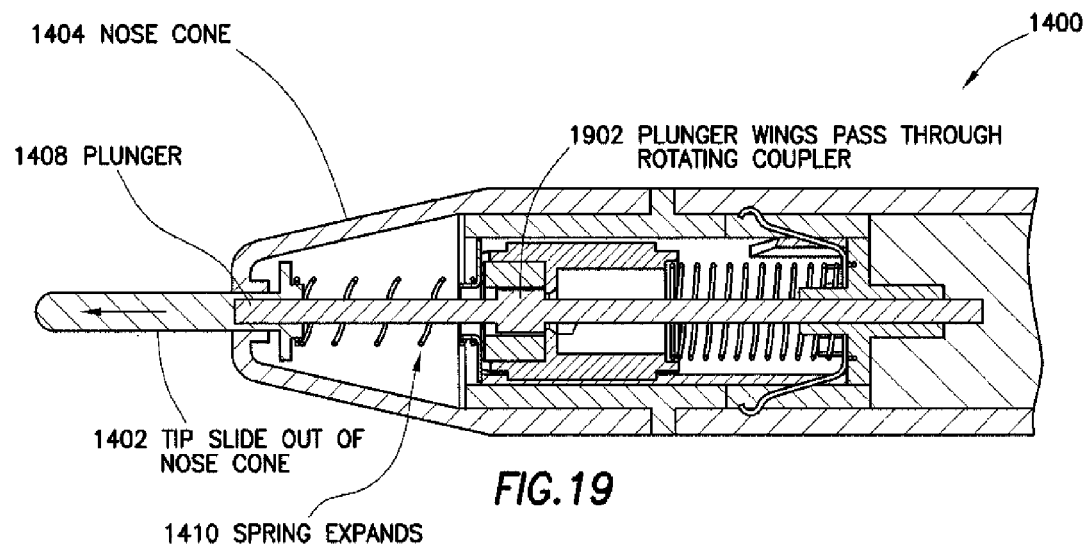

FIG. 19 shows another state of the example configuration of the passive pen (1400) shown in FIG. 14 after the user has lifted the pen. The first compression spring (1410) expands and pulls the tip (1402) and plunger (1408) back out of the nose cone (1404). The wings on the plunger (1408) pass through the slot in the rotating coupler (1902).

Figure 20:
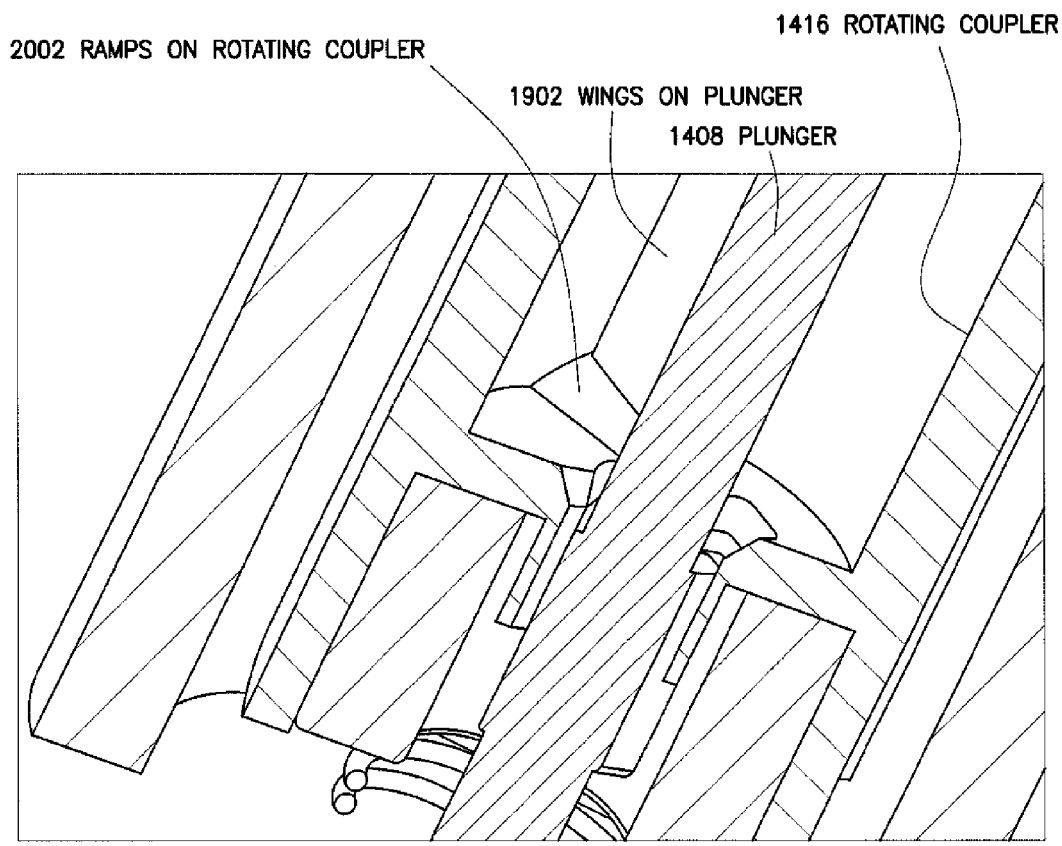

FIG. 20 shows an additional view of the example configuration of the passive pen shown in FIG. 14. As shown in FIG. 20, as the plunger (1408) travels down, the wings (1902) on the plunger contact ramps (2002) on the inside of the rotating coupler (1416). As the wings (1902) move, the wings follow the ramps (2002) forcing the rotating coupler (1416) to rotate counter clockwise. The counter clockwise rotation relocks the plunger (1408) to the bottom of the coupler. At this point, the trigger mechanism is reset and prepared for another press of the tip inward.

Figure 21:
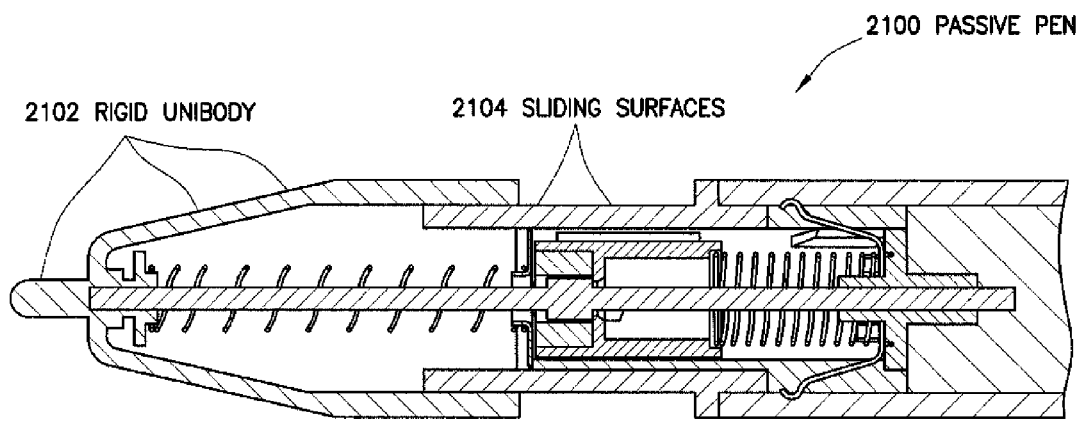

FIG. 21 show another example configuration of the passive pen (2100) with a tip trigger and rigid uni-body (2102) configuration. In one or more embodiments of the invention, the tip and rigid uni-body move a single component and slide along sliding surfaces (2104). The operation of the trigger may be similar to the passive pen shown in FIG. 14. However, in the configuration shown in FIG. 21, the entire lower outside portion of the pen slides upward as the pen is pressed down against a surface rather than only the tip of the pen.

Figure 22:
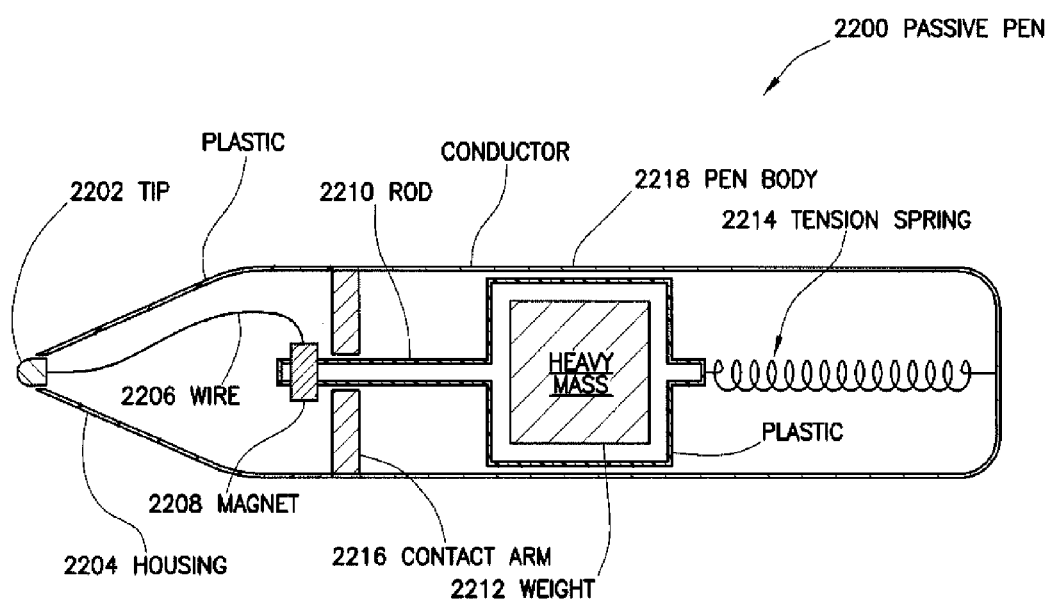

FIG. 22 shows another example configuration of a passive pen (2200) in accordance with one or more embodiments of the invention. In the configuration shown in FIG. 22, rather including a button, the switch is based on a centralized weight (2212). Specifically, the tip (2202) is housed in a non-conductive housing (2204), such as plastic. Inside, the tip (2202) is connected to one end of a wire (2206). The other end of the wire (2206) is connected to a magnet (2208), which is wrapped around a rod (2210). In one or more embodiments of the invention, the rod (2210) is made of non-conductive insulating material. The rod (2210) includes or encompasses a weight (2212) at an opposite end from the end having the magnet (2208). A tension spring (2214) is connected to the end encompassing the weight (2212). Further, a contact arm (2216) is interposed between the magnet (2208) and the weight (2212) and is connected to the pen body (2218). The tip (2202), wire (2206), magnet (2208), contact arm (2216), tension spring (2214), and pen body (2218) are made of conductive material.

In one or more embodiments of the invention, the passive pen (2200) is a double action switch that causes a first transition from a high ground state to a low ground state and a second transition from a low ground state to a high ground state at a single selection. In one or more embodiments of the invention, the amount of time between the first and second transitions after a tip trigger activation is generally predictable. Further, the transitions are triggered by hard landing events of the passive pen (2200) on the sensing region, rather than a hard press on the sensing region. In other words, the trigger is based on the vertical acceleration, such that the momentum of the weight (2212) exceeds the force to disconnect the magnet (2208) from the contact arm (2216). In one or more embodiments of the invention, no external movement may exist when the switch is triggered. In one or more embodiments of the invention, in absence of vertical acceleration, the tension spring (2214) pulls back on the weight (2212) causing the magnet (2208) to hold and maintain the passive pen (2200) in a high ground mass state. In other words, the tip (2202) is capacitively coupled to free space through the wire (2206), magnet (2208), contact arm (2216), pen body (2218), and user holding the passive pen (2200).

Throughout the specification, the pen tip and body are characterized as capacitively coupled when in a high ground mass state and not capacitively coupled when in a low ground mass state. It should be noted that, when in a high ground mass state, in addition to, or instead of, being capacitively coupled, the pen tip and pen body may be directly, or conductively, coupled. In addition, when in a low ground mass state, the pen tip and pen body may have some low level of capacitive coupling relative to the level of coupling when in a high ground mass state.

As discussed above, FIGS. 7-22 are only example configurations and are not intended to limit the scope of the invention. For example, the passive pen may include additional or alternative components, and/or may be arranged with one or more components at a different scale than shown. Additionally, some components of an example configuration may be combined into a single piece and some components may be separated into multiple pieces. Further, elements of two or more example configurations may be combined into a single configuration. Although only two ground mass states are described for each of the example configurations, the example configurations may be modified to allow the tip to switch between three or more ground mass states. Further, the various example configurations shown are cross sections of the example passive pens, the outer surface of the passive pen may have virtually any shape, size, or other appearance change, which is capable of fitting the components inside.

Figure 23:
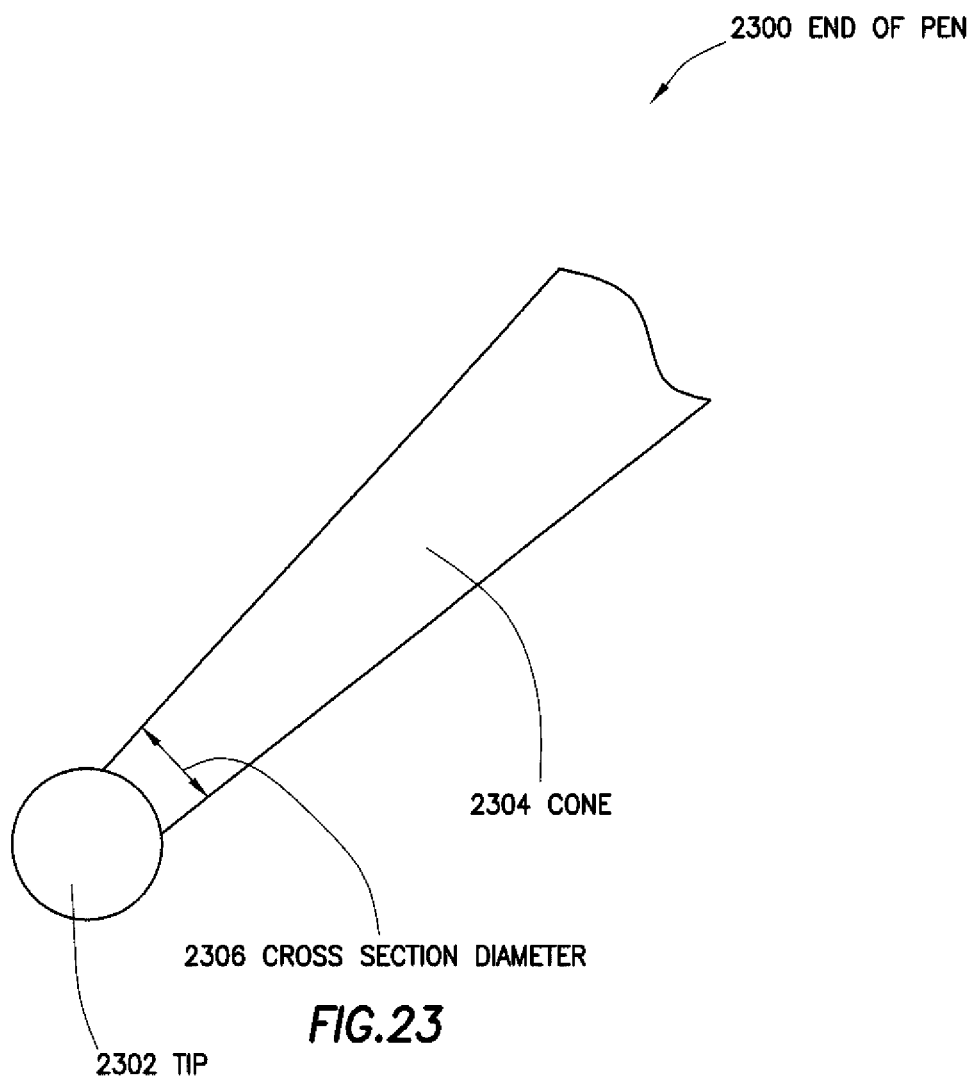
FIG. 23 shows an example end of a pen in accordance with one or more embodiments of the invention.

FIG. 23 shows an example end of pen in accordance with one or more embodiments of the invention. The example end may be used for an active pen or a passive pen, such as the passive pens shown in FIGS. 7-22. In the example shown in FIG. 23, the tip (2302) of the pen is a sphere. The tip may be connected by a pin (not shown) or a cone (2304) having a cross section diameter (2306) less than the diameter of the spherical tip (2302). Plastic or any other non-conductive material may be placed around the tip to make the tip appear to have a semispherical design. Alternatively, such material may be removed, as illustrated in FIG. 23. Compared to a standard tip, a spherical tip produces less variation in capacitive measurements of the pen tip by the input device as the angle of the pen in the sensing region varies. Typically, the conductive material near the tip influences the capacitive measurements more as the pen is tilted. By decreasing the cross section diameter, the influence of conductive material near the tip on the capacitive measurements can be reduced. While a spherical tip is suitable for a passive or active pen with a ground mass state switch, it may be used with any pen or stylus having a capacitive tip, even those without a ground mass state switch.

Further, although not presented in the above examples, the passive pen may include ink in the tip in order to write on real paper. In some embodiments, the ink may be non-conductive ink that is stored in a tubular reservoir inside a central shaft of the pen. In other embodiments, the ink may be a conductive ink that is in a small reservoir in the tip. Other techniques that include ink in a passive pen and allows the ground mass state to be selectively variable may be used without departing from the scope of the invention.

Figure 24:
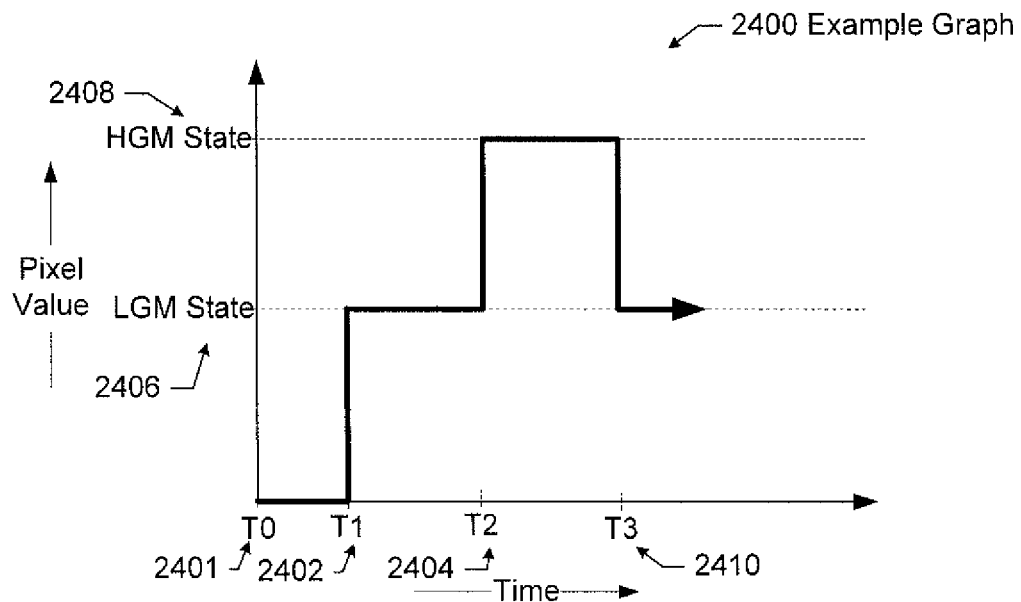
FIGS. 24 and 25 show example graphs in accordance with one or more embodiments of the invention.
Figure 25:
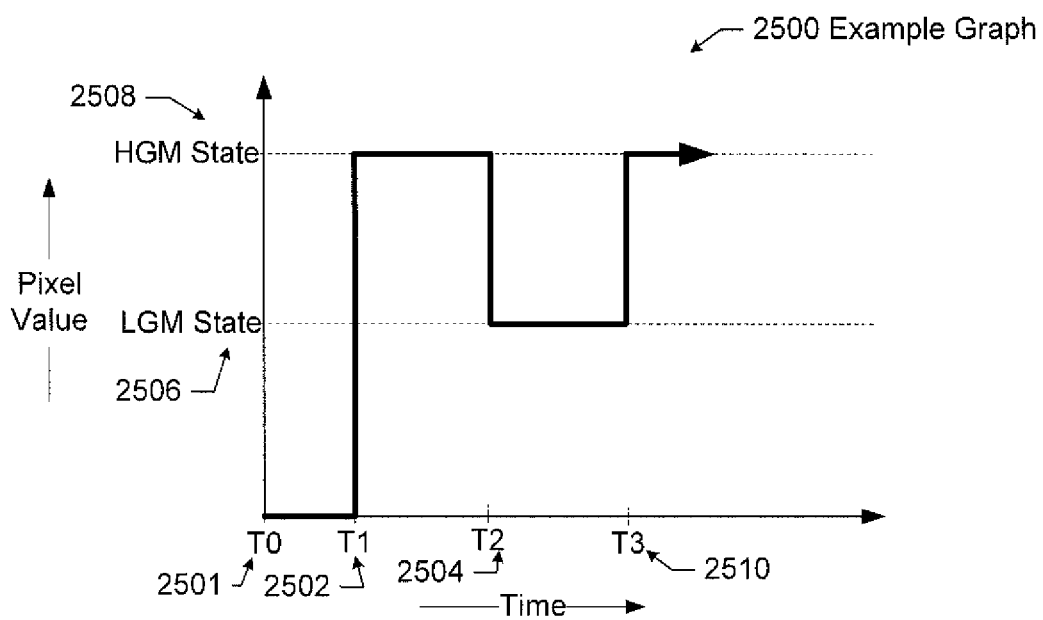

FIGS. 24 and 25 show example graphs in accordance with one or more embodiments of the invention. In the example graphs, time is on the horizontal axis and pixel value, or measured capacitance at a pixel, is on the vertical axis. The pixel value may be the value of the corresponding pixel in which the passive pen is located. In other words, the pixel that has the value represented on the graph may change between time T1 and time T3.

FIG. 24 shows an example graph (2400) in which the ground mass state of the tip is a low ground mass state. As shown in the example graph, between time T0 (2401) and time T1 (2402), the sensing region may not detect the existence of the passive pen in the example. At time T1 (2402), the passive pen lands on the sensing region with a change in capacitance not triggered. The user in the example uses the passive pen without selecting to change the capacitance between time T1 (2402) and time T2 (2404). Thus, the pixel value is within the thresholds (not shown) for detecting the passive pen, while also determining that the passive pen is intentionally in low ground mass state (2406). At time T2 (2404), the user selects to change the capacitance of the passive pen to a high ground mass state (2408). For example, the user may want to enable an application level feature of an application by changing the ground mass state of the passive pen. The pixel value remains within the threshold for the high ground mass state (2408) between time T2 (2404) and time T3 (2410). After time T3 (2410), the pixel value returns to being between the thresholds for being detectable and being in a low ground mass state (2406).

FIG. 25 shows an example graph (2500) in which the ground mass state of the tip is high ground mass state. By having a high ground mass state, the signal to noise ratio is generally higher in at least some embodiments and may exhibit improved performance. As shown in the example graph, between time T0 (2501) and time T1 (2502), the sensing region may not detect the existence of the passive pen in the example. At time T1 (2502), the passive pen lands on the sensing region with a change in capacitance not triggered. The user in the example uses the passive pen without selecting to change the capacitance between time T1 (2502) and time T2 (2504). Thus, the pixel value is greater than the threshold (not shown) for detecting the passive pen while also determining that the passive pen is intentionally in high ground mass state (2508). At time T2 (2504), the user selects to change the capacitance of the passive pen to a low ground mass state (2506). The pixel value remains within the thresholds for detecting the passive pen and determining that the passive pen is in the low ground mass state (2508) between time T2 (2504) and time T3 (2510). After time T3 (2510), the pixel value returns to being above the threshold for being in a high ground mass state (2508).

In FIGS. 24 and 25, in the double action switch embodiments, the transition at time T3 is automatic. In such a scenario, the user may be continuing to press a button without affecting the ground mass state of the pen. The user releases the button, which may be undetected, and re-press the button to change the ground mass state. In the single action switch embodiments, the user has to release the button at T3 to revert to the default state.

Although FIGS. 24 and 25 show straight horizontal lines, the horizontal lines may not be straight. For example, noise, the ground mass state of the input device, and other environmental factors may affect the pixel value. Additionally, although FIGS. 24 and 25 show vertical line transitions between the states, the transitions may be sloped, such that a time change exists between the start of a state change and the end of the state change. The amount of time change is dependent on the speed at which the passive pen is able to effectuate a change in the ground mass state of the tip. For example, the configuration of the passive pen in FIG. 13, which relies on the user implementing the transition, may have a greater slope and take a longer time than the configuration in FIG. 14, which includes mechanical components to speed the transition. Further, in accordance with one or more embodiments of the invention, the ratio of the high ground mass state to low ground mass state may be different than shown in FIG. 24. The ratio may be dependent on the particular passive pen being used, such as the amount of air gap in the low ground mass mode and the amount of capacitive coupling in each state.

Additionally, in some embodiments, the length of time during which the ground mass state is switched can be used to verify an intentional ground mass change. For example, in an embodiment, without interacting with a button of a pen, the ground mass state of the pen is high. When the button is pressed, the ground mass state switches to low, and back to high without further input from the user. The pen may be designed so that the switch from high to low, and back to high occurs over a time period, with some variation. The input device may then be configured to analyze detected ground mass state changes in order to verify that they occur in the specified time period. If the ground mass state change occurs too quickly, or slowly, the input device may determine that the ground mass state change was accidental since it falls outside the design characteristics of the pen. In this manner, the input device may only accept intentional button presses from a user. This may be particularly useful if the ground mass state is used to initiate an action on a host device communicatively coupled to the input device. For example, the host device may change the color of lines drawn with the pen based on a change in high ground mass state.

In some embodiments, the expected time period over which ground mass state changes occur can be adjusted by the user. For example, the user may manually adjust the tension of a spring in the pen which adjusts the time period. In this manner, additional information may be communicated to the host device. For example, the input device may identify the length of the time period over which the ground mass state change occurs, and transmit this, or related, information to the host device. The host device may perform various actions with this input, e.g., change the width of a line drawn with the pen. By varying the time period, a plurality of desired line widths may be communicated to the host device with only two levels of ground mass utilized.

Figure 26:
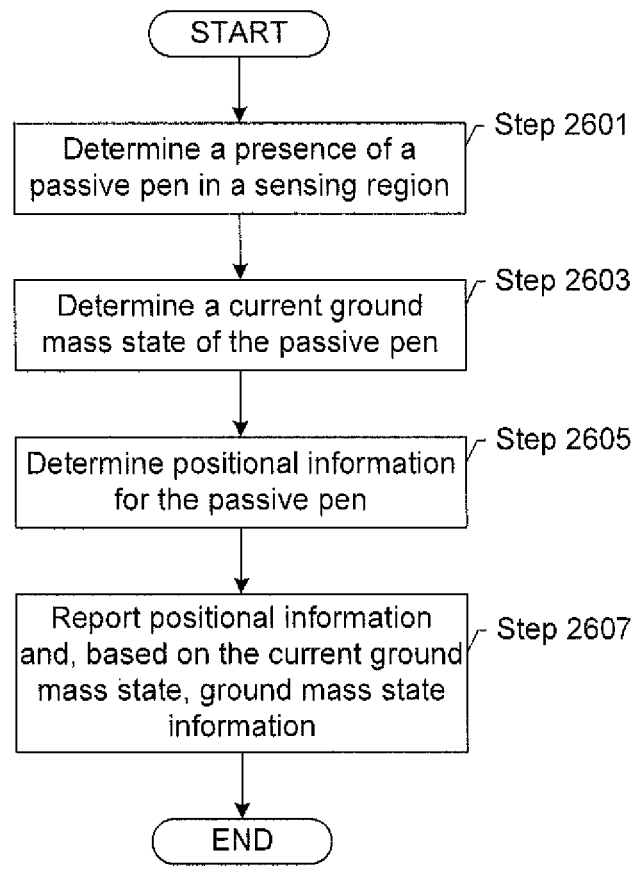
FIG. 26 shows a flowchart in accordance with one or more embodiments of the invention.

FIG. 26 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. The Steps of FIG. 26 may be performed by the processing system, determination module, input device, firmware on the host, any other component of the system, or combination thereof in accordance with one or more embodiments of the invention.

In Step 2601 of FIG. 26, the presence of the passive pen in the sensing region is determined. Specifically, sensor electrodes may transmit transmitter signals and resulting signals are received in accordance with mutual capacitive and/or absolute capacitive sensing techniques. Measurements of the resulting signals are acquired. Preprocessing may be performed on the measurements to remove noise, adjust for the baseline, and perform any other filtering. The resulting values are the measurement values. If one or more measurement values are above a detection threshold, then the passive pen is determined to be in the present in the sensing region.

In Step 2603, the current ground mass state of the passive pen is determined in accordance with one or more embodiments of the invention. At this stage, a determination is made whether the passive pen is in the low ground mass state or a high ground mass state. The determined ground mass state of the passive pen may be based on the single sensing frame or a collection of sensing frames. By way of an example of the collection of sensing frames case, an analysis of a moving window of sensing frames may be performed. For example, the moving window may be the previous 300 sensing frames. The analysis may determine whether the measurement values corresponding to the position of the passive pen match criteria for determining a particular ground state of the passive pen. For example, the determination may be whether the prior window of frames and current frame measurement values match the graphs shown in FIGS. 24 and 25. The relative levels, slopes, and pulse width may be analyzed to determine whether the defined requirements for the event to be declared, where the event is a ground mass state change of the tip. For example, if the slope of measurement values increases slowly, a determination may be made that the input device is better grounded than the tip of the passive pen switching to high ground mass state. Alternatively, if the measured values match FIGS. 24 and 25, an event of a ground mass state change of the tip may be detected.

In one or more embodiments of the invention, the processing system or determination module may analyze the previous frames to determine whether the criteria for a double action switch or a single action switch are satisfied. In other words, the system may determine, at a first time using a first frame of measurement values, the current ground mass state of the passive pen based on the resulting signals to be at a first ground mass state, determine, at a second time occurring within a threshold amount of time after the first time and using a second frame of measurement values, that the current ground mass state of the passive pen is at a second ground mass state. The system may, thereby, determine that a change occurred matching a single action switch. If the passive pen is a single action switch, then the criteria for the single action switch may be deemed to be satisfied and the reportable event of the activation of the activation of the switch detected. If the passive pen is a double action switch, then the system may wait until determining, at a third time that is within a threshold amount of time subsequent to the second time, that the ground mass state of the passive pen is at the first ground mass state. If such an event occurs, then the system may determine that the reportable event occurred.

By way of another example, in the single sensing frame case, the input device performs a scan of the sensing region to obtain measurement values and determines whether the at least one measurement value is greater than the detection threshold, and all measurement values are less than a high ground mass state threshold. In some embodiments, the absolute capacitive measurement may not be utilized to identify high ground mass or low ground mass states. Rather, the input device may look for a chance in capacitance measurements to identify a change in ground mass states. In some situations, it may be difficult to tell whether a pen is in high ground or low ground mass state based on a single capacitive measurement. The capacitive measurement of the low ground mass state may drift over time due to changes in temperature, voltage, etc.

Continuing with FIG. 26, in Step 2605, positional information is determined for the passive pen in accordance with one or more embodiments of the invention. Determining positional information may be performed using techniques known in the art.

In Step 2607, positional information and, based on the current ground mass state, ground mass state information is reported in accordance with one or more embodiments of the invention. In one or more embodiments of the invention, the information may be reported to the host device, a device driver, application, or any other component in accordance with one or more embodiments of the invention. In some embodiments, the ground mass state information is reported as an event, such as a button selection or deselection. In some embodiments, the current ground mass state of the tip may be reported. In some embodiments, the change in ground mass state of the tip is reported. In some embodiments, the ground mass state of the tip and the change or detection or lack thereof is reported. For example, the information may indicate the last ground mass state of the tip detected before the tip left the sensing region.

FIG. 27 shows an example reportable events table (2700) in accordance with one or more embodiments of the invention. Specifically, FIG. 27 shows an example set of ground mass state changes that may be detected and reported by the input device in accordance with one or more embodiments of the invention. The reporting of the particular events may be as an event code, as a button selection, or as another event indicator. Each event in FIG. 27 may correspond to a unique command on the application level. For example, a user may perform the specified actions with the passive pen to trigger the event and cause the application to perform an action defined by the application. Each row in the table corresponds to a particular event and each column corresponds to triggers for the particular event.

In event 1, the initial location of the passive pen is in the sensing region, the passive pen is in a default ground mass state, which means that the button is not selected by the user. In event 1, the user may subsequently select the button to trigger the distinct event 1. The result of the triggers for event 1 occurring is that the input device may report, as the ground mass state information, that event 1 occurred.

In event 2, the initial location of the passive pen is in the sensing region, the passive pen is in a modified ground mass state, which means that the button is selected by the user. In event 2, the user may subsequently deselect the button to trigger the distinct event 2. The result of the triggers for event 2 occurring is that the input device may report, as the ground mass state information, that event 2 occurred.

In event 3, the initial location of the passive pen is in the sensing region, the passive pen is in a modified ground mass state, which means that the button is selected by the user. In event 3, the user may subsequently remove the passive pen from the sensing region to trigger the distinct event 3. The result of the triggers for event 3 occurring is that the input device may report, as the ground mass state information, that event 3 occurred.

In event 4, the initial location of the passive pen is in the sensing region, the passive pen is in the modified ground mass state when the pen is first detected, which means that the button is selected by the user upon the initial detection. In other words, when the passive pen landed on the sensing region, the button was selected. In event 4, the user may subsequently deselect the button to trigger the distinct event 4. The result of the triggers for event 4 occurring is that the input device may report, as the ground mass state information, that event 4 occurred.

In event 5, the initial location of the passive pen is in the sensing region, the passive pen is in a default ground mass state, which means that the button is not selected by the user. In event 5, the user may subsequently remove the passive pen from the sensing region to trigger the distinct event 5. The result of the triggers for event 5 occurring is that the input device may report, as the ground mass state information, that event 5 occurred.

In event 6, the initial location of the passive pen is not in the sensing region, the passive pen is in a modified ground mass state, which means that the button is selected by the user. In event 6, the user may subsequently put the passive pen on the sensing region to trigger the distinct event 6. The result of the triggers for event 6 occurring is that the input device may report, as the ground mass state information, that event 6 occurred.

In event 7, the initial location of the passive pen is not in the sensing region, the passive pen is in a default ground mass state, which means that the button is not selected by the user. In event 7, the user may subsequently put the passive pen on the sensing region to trigger the distinct event 7. The result of the triggers for event 7 occurring is that the input device may report, as the ground mass state information, that event 7 occurred.

The various events may not be applicable to all configurations of passive pens. For example, passive pens that rely on a button tip may not be capable of achieving event 6. By way of another example, passive pens with double action switches may not be capable of achieving event 2.

For the following example, consider the scenario that a draftsman is using a passive pen to draw a figure. Because the pen is a passive pen, the pen does not have electrical components that interfere with the detection of positional information. In the example, the passive pen has a selectable button that is connected to a single action mechanical switch. As the draftsman is drawing the figure, the draftsman may want to change line thickness and change colors. When the draftsman initially touches the surface of the sensing region with the button selected, the event of the initial touch on the sensing region having a selected button is detected, and information thereof is reported to the application. In response, the application cycles through the various line thicknesses. When the draftsman subsequently selects the button again or releases the button, the cycling stops and the last line thickness set as the current line thickness. When the draftsman touches the surface of the sensing region with the button not selected and later selects the button, the event of the selection of the button after initial touch on the sensing region is detected and information thereof is reported to the application. In response, the application cycles through the various colors. When the draftsman subsequently releases the button or selects the button again depending on the passive pen, the cycling stops and the last color is set as the current color. Thus, using the configuration, the draftsman may easily change the line thickness and color by mere selection of the button and lift of the passive pen without having to move the passive pen around the sensing region to select a graphical user interface button.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A passive pen comprising:
   a pen body; and
   a tip disposed at a first end of the pen body, wherein the tip capacitively couples to the pen body and the capacitive coupling is configured to change and switch the tip from a first ground mass state to a second ground mass state; and
   a compressible non-conductive substance between the tip and the pen body, wherein the compressible non-conductive substance is compressed, relative to a compression level of tip in a first position, when the tip is in a second position.

2. The passive pen of claim 1, wherein the tip is further configured to switch to a third ground mass state due to a change in the capacitive coupling.

3. The passive pen of claim 1, wherein the first ground mass state has a higher ground mass than the second ground mass state.

4. A passive pen comprising:
   a pen body;
   a tip disposed at a first end of the pen body; and
   a mechanical switch for controlling a capacitive coupling of the tip to the pen body, the capacitive coupling configured to switch from a first ground mass state to a second ground mass state upon activation of the mechanical switch, the mechanical switch comprising a selectable button located on a second end of the pen body, the selectable button configured to activate the mechanical switch to alter the capacitive coupling.

5. The passive pen of claim 4, wherein the mechanical switch is a double action mechanical switch configured to switch the capacitive coupling from the first ground mass state to the second ground mass state and back to the first ground mass state upon a single activation of the double action mechanical switch.

6. A passive pen comprising:
   a pen body;
   a tip disposed at an end of the pen body; and
   a selectable button located on an outer surface of the pen body proximate to the tip, the selectable button configured to control a capacitive coupling of the tip to the pen body, the capacitive coupling configured to switch from a first ground mass state to a second ground mass state upon selection of the selectable button.

7. The passive pen of claim 6, wherein the tip is configured to switch from a first position relative to the pen body to a second position relative to the pen body, and wherein the tip switching from the first position to the second position switches the tip from the first ground mass state to the second ground mass state.

8. The passive pen of claim 7, wherein the tip is mechanically connected to a mechanical switch for switching the capacitive coupling, the mechanical switch comprising the selectable button.

9. The passive pen of claim 8, wherein the mechanical switch comprises a magnet.

10. The passive pen of claim 6, further comprising:
    a double action mechanical switch configured to switch the tip from the first ground mass state to the second ground mass state and back to the first ground mass state upon a single activation of the double action mechanical switch, wherein the tip is configured to stay in the second ground mass state for a duration of time.

11. The passive pen of claim 10, further comprising:
    an input control located on the pen body and configured to adjust the duration of time that the tip is configured to stay in the second ground mass state.

12. The passive pen of claim 6, further comprising:
    a single action mechanical switch configured to:
    switch the tip from the first ground mass state to the second ground mass state upon a first activation of the single action mechanical switch and change in the capacitive coupling, and
    switch the tip from the second ground mass state to the first ground mass state upon a second activation of the single action mechanical switch and change in the capacitive coupling.

* * * * *